United States Patent
Ito et al.

(10) Patent No.: US 9,582,721 B2
(45) Date of Patent: Feb. 28, 2017

(54) METHOD AND APPARATUS FOR DETERMINING MOVEMENT

(71) Applicant: FUJITSU LIMITED, Kawasaki-shi, Kanagawa (JP)

(72) Inventors: Fumito Ito, Kita (JP); Sayaka Suwa, Itabashi (JP); Shohei Kuwabara, Itabashi (JP)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 14/559,967

(22) Filed: Dec. 4, 2014

(65) Prior Publication Data

US 2015/0169961 A1    Jun. 18, 2015

(30) Foreign Application Priority Data

Dec. 13, 2013 (JP) ................. 2013-257891

(51) Int. Cl.
  *G06K 9/00*     (2006.01)
  *G06K 9/46*     (2006.01)
  *G06T 7/00*     (2006.01)

(52) U.S. Cl.
  CPC ....... *G06K 9/00711* (2013.01); *G06K 9/00369* (2013.01); *G06K 9/46* (2013.01); *G06T 7/004* (2013.01); *G06T 7/0057* (2013.01); *G06K 2009/4666* (2013.01); *G06T 2207/10016* (2013.01); *G06T 2207/10028* (2013.01); *G06T 2207/20044* (2013.01); *G06T 2207/30196* (2013.01); *G06T 2207/30201* (2013.01)

(58) Field of Classification Search
  None
  See application file for complete search history.

(56) References Cited

U.S. PATENT DOCUMENTS

| | | | |
|---|---|---|---|
| 8,325,984 B2 * | 12/2012 | Lee | G06K 9/00362 345/419 |
| 8,542,910 B2 * | 9/2013 | Leyvand | A63F 13/06 382/103 |
| 2002/0028003 A1 * | 3/2002 | Krebs | G06K 9/00348 382/115 |
| 2007/0247524 A1 | 10/2007 | Yoshinaga et al. | |
| 2008/0319835 A1 | 12/2008 | Tsuji | |

FOREIGN PATENT DOCUMENTS

| | | |
|---|---|---|
| JP | 2007-286995 | 11/2007 |
| JP | 2009-003701 | 1/2009 |
| JP | 2012-123667 | 6/2012 |
| JP | 2012-215555 | 11/2012 |

* cited by examiner

*Primary Examiner* — Hadi Akhavannik
(74) *Attorney, Agent, or Firm* — Fujitsu Patent Center

(57) ABSTRACT

In order to determine an orientation of a person in various situations, a movement determining method executed by an information processing apparatus is provided. In the movement determining method, first, the information processing apparatus acquires a first distance between a head of the person and a reference position and a second distance between a neck of the person and the reference position. Then, the information processing apparatus determines the orientation of the person on the basis of a comparison result between the first distance and the second distance.

15 Claims, 17 Drawing Sheets

211

| ARTICLE INFORMATION TABLE | | |
|---|---|---|
| ARTICLE ID | REGION INFORMATION | TYPE |
| ARTICLE #1 | (25,10), (10,10), (15,20), (25,20) | NEAR |
| ARTICLE #2 | (40,10), (25,10), (25,20), (35,20) | NEAR |
| ARTICLE #3 | (25,25), (17,25), (20,30), (25,30) | FAR |
| ⋮ | ⋮ | ⋮ |

FIG. 10

METHOD AND APPARATUS FOR DETERMINING MOVEMENT

CROSS-REFERENCE TO RELATED APPLICATION

This application is based upon and claims the benefit of priority of the prior Japanese Patent Application No. 2013-257891, filed on Dec. 13, 2013, the entire contents of which are incorporated herein by reference.

FIELD

The embodiments discussed herein relates to a method and an apparatus for determining a movement.

BACKGROUND

In recent years, a technology to determine the movement of a person on the basis of an image captured by an image capturing device has been developed. This kind of technology includes a technology to determine the orientation of a person. For example, in a proposed technology, principal component analysis is conducted on the data of a layer of a shoulder which is extracted from 3D scan data of a subject, and the second principal component is determined as the "direction of body". Also, there is a technology to determine whether a person pays attention to a specific region such as a store shelf. For example, in a proposed technology, a face is detected from a region of a moving object that is detected on the basis of an image and measured person position data, and the sight line direction is calculated from the detected face image, to thereby determine the attention position of the person. See, for example, Japanese Laid-open Patent Publication 2012-215555, and Japanese Laid-open Patent Publication 2007-286995.

In the meantime, one may conceive of a method to determine the orientation of a person on the basis of the sight line direction calculated as above. However, in this method, since the sight line is unable to be captured when the person wears glasses or sunglasses for example, there is a problem that the situation that allows the orientation of the person to be determined is limited.

SUMMARY

According to one aspect, there is provided a movement determining method including: acquiring, by an information processing apparatus, a first distance between a head of a person and a reference position and a second distance between a neck of the person and the reference position; and determining, by the information processing apparatus, an orientation of the person on the basis of a comparison result between the first distance and the second distance.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of an article information table;

DESCRIPTION OF EMBODIMENTS

Figure 1:
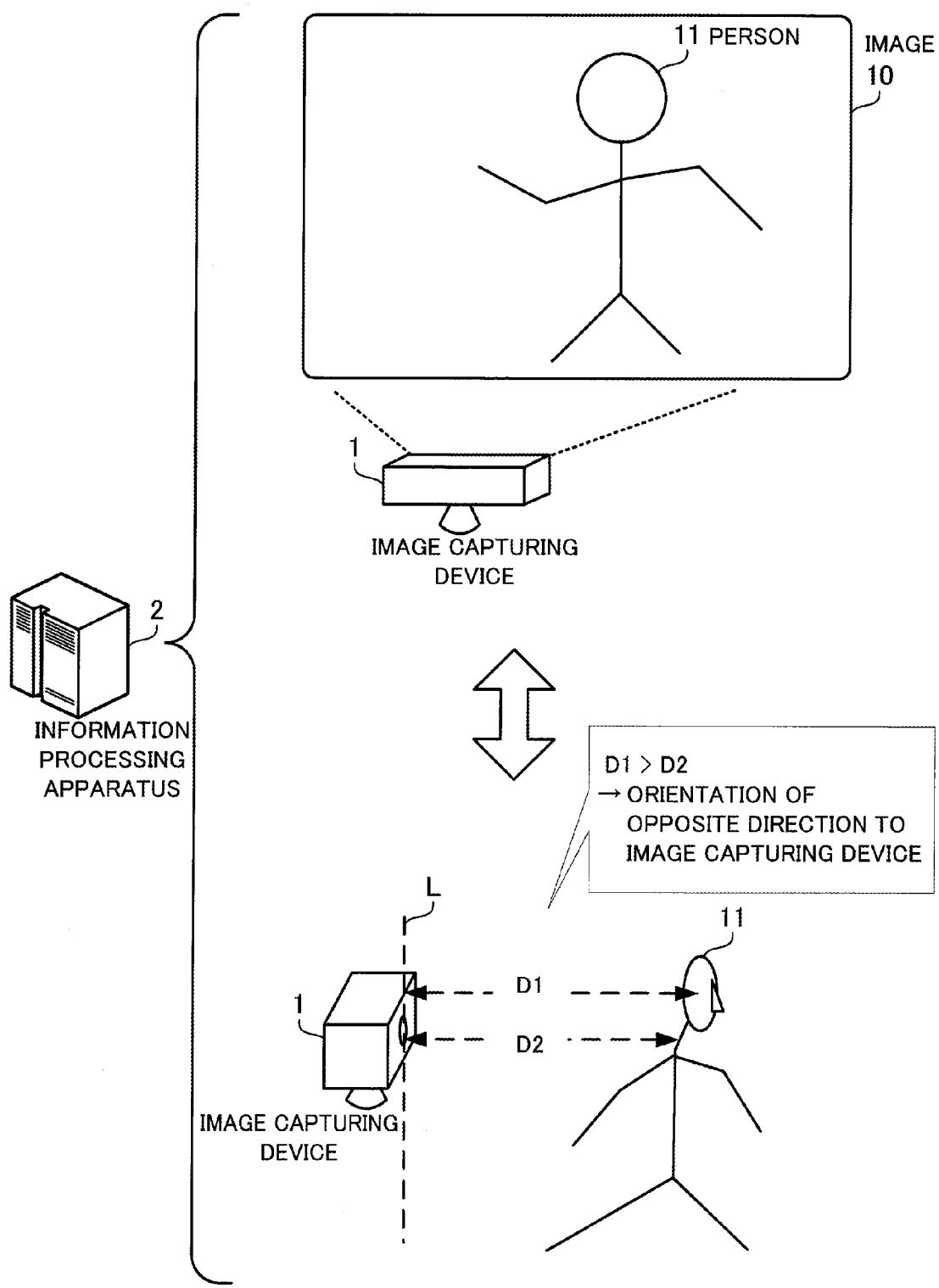
FIG. 1 illustrates an example of a process of an information processing apparatus of a first embodiment.

Several embodiments will be described below with reference to the accompanying drawings, wherein like reference numerals refer to like elements throughout.

First Embodiment

FIG. 1 illustrates an example of a process of an information processing apparatus of the first embodiment. The information processing apparatus 2 is operable to acquire a distance D1 between a predetermined reference position and the head of a person 11 (the first distance), and a distance D2 between the reference position and the neck of the person 11 (the second distance). The distances D1, D2 are measured, for example, using an image captured by an image capturing device and a predetermined sensor. Note that the method of measuring the distances D1, D2 is not limited particularly.

In FIG. 1, the image capturing device 1 is located at the reference position, for example. The information processing apparatus 2 acquires the measured distances D1, D2 to the person 11 appearing in the image 10 captured by the image capturing device 1. In this case, the image capturing device 1 may have a function to measure the distances D1, D2, or another sensor other than the image capturing device 1 may have the same function. Note that a line segment L depicted in the lower portion of FIG. 1 represents the position of an image capturing face of the image capturing device 1, which corresponds to the reference position for measuring the distances. The information processing apparatus 2 determines the orientation of the person 11 on the basis of the comparison result between the distance D1 and the distance D2. For example, as illustrated in the lower portion of FIG. 1, when the distance D1 is equal to or longer than the distance D2, the orientation of the person 11 is determined to be the opposite direction to the image capturing device 1. Also, for example, although not depicted, when the distance D1 is shorter than the distance D2, the orientation of the person 11 is determined to be the direction toward the image capturing device 1.

According to this method of determining the orientation of the person, the orientation of the person is determined in various situations. For example, in the method that uses the sight line direction to determine the orientation of the person, the orientation of the person is unable to be determined, in a situation where the person wears glasses or sunglasses and the sight line is unable to be captured. In contrast, in the method that uses the comparison result between the distances D1, D2 to determine the orientation of the person, the orientation is able to be determined in that situation. Also, since the distances D1, D2 can be measured by a commercially available device, the information processing apparatus 2 is able to determine the orientation of the person by a simple process of comparing the distance D1 and the distance D2. Thereby, the process load of the information processing apparatus 2 is reduced, and the cost for introducing the information processing apparatus 2 is suppressed.

Second Embodiment

Figure 2:
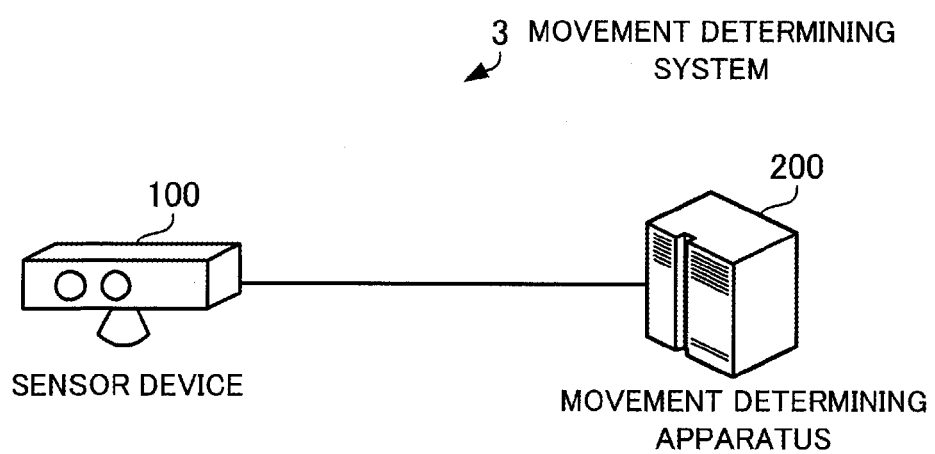
FIG. 2 illustrates an example of a movement determining system of a second embodiment.

FIG. 2 illustrates an example of a movement determining system of the second embodiment. The movement determining system 3 includes a sensor device 100 and a movement determining apparatus 200. The sensor device 100 and the movement determining apparatus 200 are both located in a store where articles are sold. Alternatively, it may be such that only the sensor device 100 is located in the store, and the movement determining apparatus 200 is located outside the store. Note that a part of the function of the sensor device 100 is an example of the function of the image capturing device 1 of the first embodiment. The movement determining apparatus 200 is an example of the information processing apparatus 2 of the first embodiment.

The sensor device 100 has a function to capture an image. The sensor device 100 captures at least the region where the articles are located, from the region in the store. For example, the sensor device 100 captures the region of store shelves where the articles are located. Also, the sensor device 100 detects skeletal framework information of a person (in the present embodiment, a customer) appearing in the image. In the present embodiment, the sensor device 100 detects at least a wrist, a neck, and a head, as areas of the skeletal framework of the customer. Also, the skeletal framework information includes position information of the respective areas. The position information includes coordinates and a depth in an image, with respect to the respective areas of the skeletal framework. The depth means the distance, at each pixel, from the sensor device 100 to an object. The sensor device 100 transmits the data of the captured image, the depth information measured for each pixel, and the detected skeletal framework information, to the movement determining apparatus 200. The sensor device 100 periodically transmits these information to the movement determining apparatus 200. Note that the sensor device 100 may transmit information indicating the depth of each pixel of the image, together with the image data, to the movement determining apparatus 200.

The movement determining apparatus 200 is a computer that determines the movement of the customer. Each time the movement determining apparatus 200 receives the image data and the skeletal framework information from the sensor device 100, the movement determining apparatus 200 analyzes the received skeletal framework information and the image data, in order to determine whether the customer appearing in the image has taken an article in his or her hand. First, the movement determining apparatus 200 determines the orientation of the customer appearing in the image, on the basis of the received skeletal framework information. Then, the movement determining apparatus 200 limits, on the basis of the determined orientation, the region in the image which is to be used in determining whether the customer appearing in the image has taken an article in his or her hand. Note that, in addition to the determination of whether the customer has taken an article in his or her hand, the movement determining apparatus 200 may determine presence or absence of a movement of the customer, such as a movement of just passing in front of the article, a movement of paying attention to the article, and a movement of taking an interest in the article.

Figure 3:
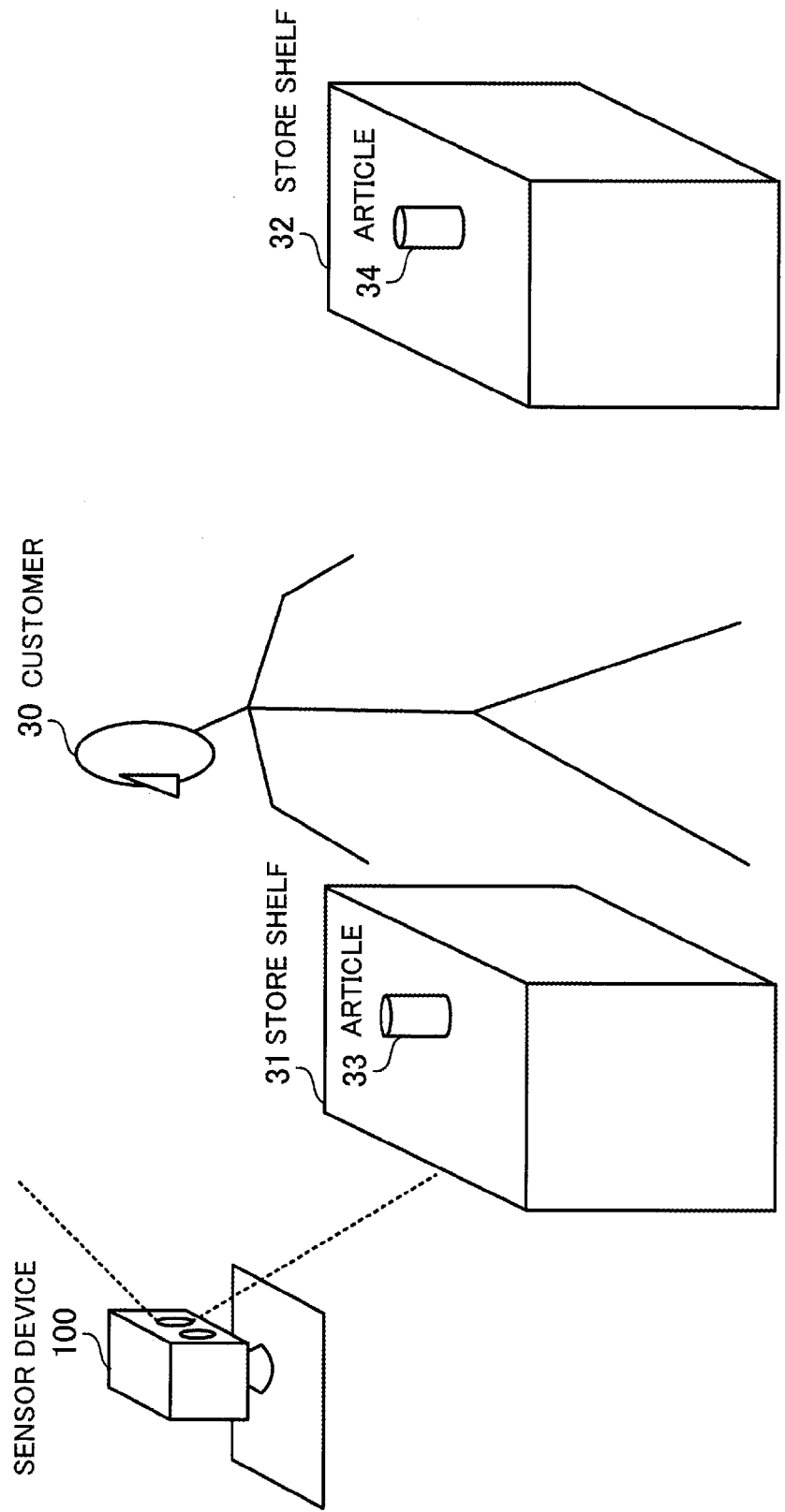
FIG. 3 illustrates an exemplary arrangement of a sensor device.

FIG. 3 illustrates an exemplary arrangement of the sensor device. In the example of FIG. 3, an article 33 is located on a top face of a store shelf 31. Also, another store shelf 32 is located at the right side of FIG. 3, where an article 34 is located on a top face of the store shelf 32. The region between the store shelf 31 and the store shelf 32 is a region where the customer 30 walks around. The sensor device 100 is located at a position on the opposite side of the store shelf 31 to the region where the customer 30 walks around. In this case, the sensor device 100 transmits the image data including the customer 30, the store shelves 31, 32, and the articles 33, 34 as the objects, and the skeletal framework information of the customer 30, to the movement determining apparatus 200.

Figure 4:
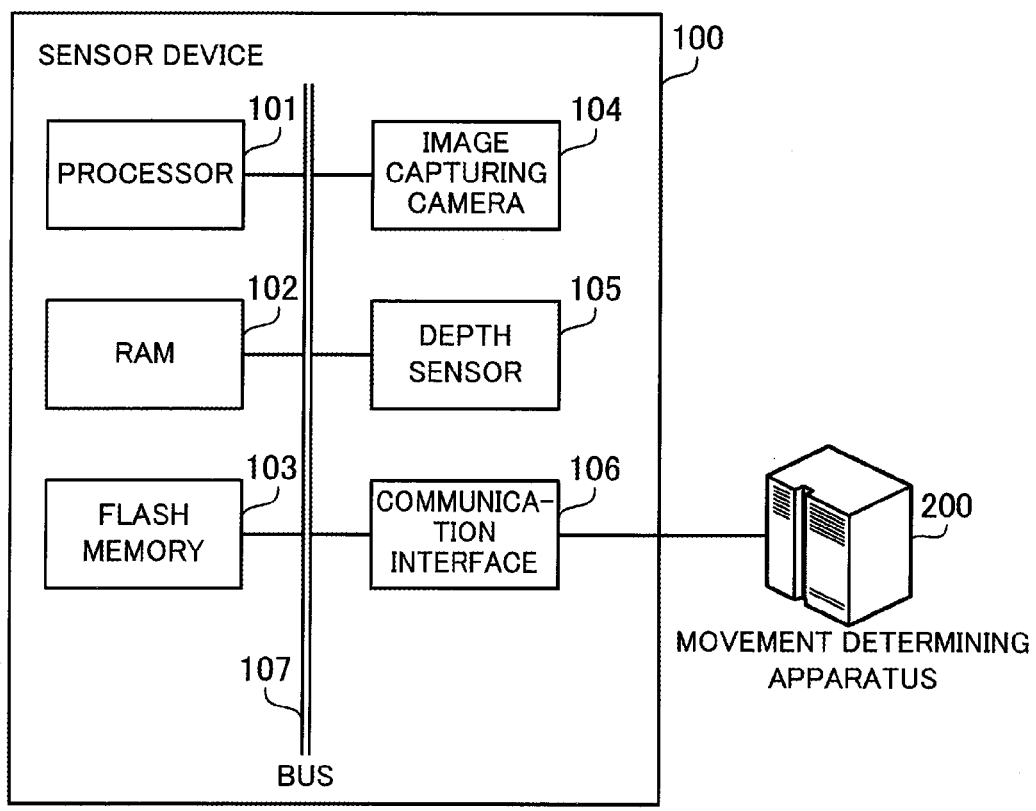
FIG. 4 is a block diagram of an exemplary hardware configuration of a sensor device.

FIG. 4 is a block diagram of an exemplary hardware configuration of the sensor device. The sensor device 100 includes a processor 101, a RAM (Random Access Memory) 102, a flash memory 103, an image capturing camera 104, a depth sensor 105, and a communication interface 106. These units are connected to a bus 107 in the sensor device 100. The processor 101 includes a computing unit that executes commands of programs, which is a CPU (Central Processing Unit) for example. The processor 101 loads at least a part of programs and data stored in the flash memory 103 into the RAM 102, to execute the programs. Note that the processor 101 may include a plurality of processor cores. Also, the sensor device 100 may include a plurality of processors. Also, the sensor device 100 may parallelly execute the processing, using the processors or the processor cores. Also, a cluster of two or more processors, a dedicated circuit such as an FPGA (Field Programmable Gate Array) and an ASIC (Application Specific Integrated Circuit), a cluster of two or more dedicated circuits, a combination of a processor and a dedicated circuit, and the like may be referred to as "processor". The RAM 102 is a volatile memory that temporarily stores the programs executed by the processor 101 and the data that is referred to from the program. Note that the sensor device 100 may include a memory of a type different from the RAM, or may include a plurality of volatile memories. The flash memory 103 is a non-volatile storage device that stores programs and data of firmware, application software, and the like. Note that the sensor device 100 may include a storage device of another type such as a hard disk drive (HDD), and may include a plurality of non-volatile storage devices. The image capturing camera 104 captures an image, and outputs the captured image data to the processor 101. The depth sensor 105 measures the depth at each pixel of the image captured by the image capturing camera 104, and outputs the measured depth to the processor 101. As the method to measure the depth, any of various measurement methods such as, for example, the TOF (Time Of Flight) method and the pattern projection method may be employed. In the TOF (Time Of Flight) method, the depth is measured from the round-trip time of a laser beam. In the pattern projection method, the depth is measured by the distortion of a pattern of a reflected light beam (for example, infrared light, etc.). When the TOF method or the pattern projection method is employed, the depth sensor 105 includes a light beam projecting device that projects the laser beam, the infrared light, or the like, and a sensor that detects the reflection component of the projected light beam. The communication interface 106 performs communication with another information processing apparatus (for example, the movement determining apparatus 200). Note that the program executed by the processor 101 may be copied into the flash memory 103 from another storage device. The Kinect (registered trademark) sensor of Microsoft Corporation may be used as the sensor device 100, for example.

Figure 5:
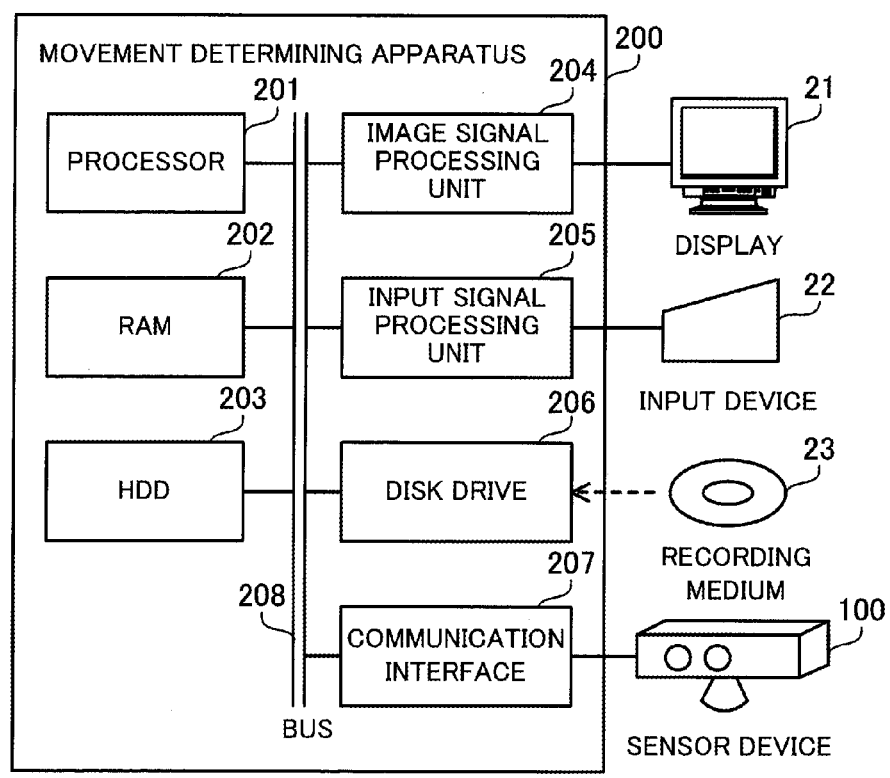
FIG. 5 is a block diagram of an exemplary hardware configuration of a movement determining apparatus.

FIG. 5 is a block diagram of an exemplary hardware configuration of the movement determining apparatus. The movement determining apparatus 200 includes a processor 201, a RAM 202, a HDD 203, an image signal processing unit 204, an input signal processing unit 205, a disk drive 206, and a communication interface 207. These units are connected to a bus 208 in the movement determining apparatus 200. The processor 201 includes a computing unit that executes commands of programs, similarly to the aforementioned processor 101. The RAM 202 is a volatile memory that temporarily stores programs and data executed by the processor 201, similarly to the aforementioned RAM 102. The HDD 203 is a non-volatile storage device that stores programs and data of an operating system (OS), firmware, and software such as application software. Note that the movement determining apparatus 200 may include a storage device of another type such as a flash memory, and may include a plurality of non-volatile storage devices. The image signal processing unit 204 outputs the image to a display 21 connected to the movement determining apparatus 200 in accordance with a command from the processor 201. The display 21 is, for example, a CRT (Cathode Ray Tube) display, a liquid crystal display, or the like. The input signal processing unit 205 acquires an input signal from an input device 22 connected to the movement determining apparatus 200, and notifies the processor 201 of the input signal. The input device 22 is, for example, a pointing device such as a mouse, a touch panel, a keyboard, or the like. The disk drive 206 is a drive device that reads programs and data recorded in a recording medium 23. The recording medium 23 is, for example, a magnetic disk such as a flexible disk (FD) and a HDD, an optical disc such as a compact disc (CD) and a digital versatile disc (DVD), or a magneto-optical disk (MO). The disk drive 206 stores the programs and the data read from the recording medium 23 in the RAM 202 or the HDD 203, in accordance with a command from the processor 201. The communication interface 207 performs communication with another information processing apparatus (for example, the sensor device 100). Note that the movement determining apparatus 200 may be configured without the disk drive 206. When controlled solely from another terminal device, the movement determining apparatus 200 may be configured without the image signal processing unit 204 and the input signal processing unit 205. Also, the display 21 and the input device 22 may be formed integrally with the housing of the movement determining apparatus 200.

Next, with reference to FIGS. 6 and 7, description will be made of the determination method, of the movement determining apparatus 200, for determining whether a hand of the customer has entered into an article location region. The article location region means a space where a certain article is located, and for example is used in determining whether the customer has taken an article in his or her hand. For example, the article location region is a region from a top face of a store shelf where a certain article is located to a predetermined height above the top face. Because the determination of whether a hand has entered into a three-dimensional space like this makes the process complicated, the movement determining apparatus 200 sets a two-dimensional region corresponding to the article location region in the image, and determines whether a hand has entered into the article location region on the basis of whether the hand of the customer (for example, the representative position of the wrist) is included in the set two-dimensional region. In the following, the two-dimensional region set on the image at a portion corresponding to the article location region is sometimes referred to as "set region".

Figure 6:
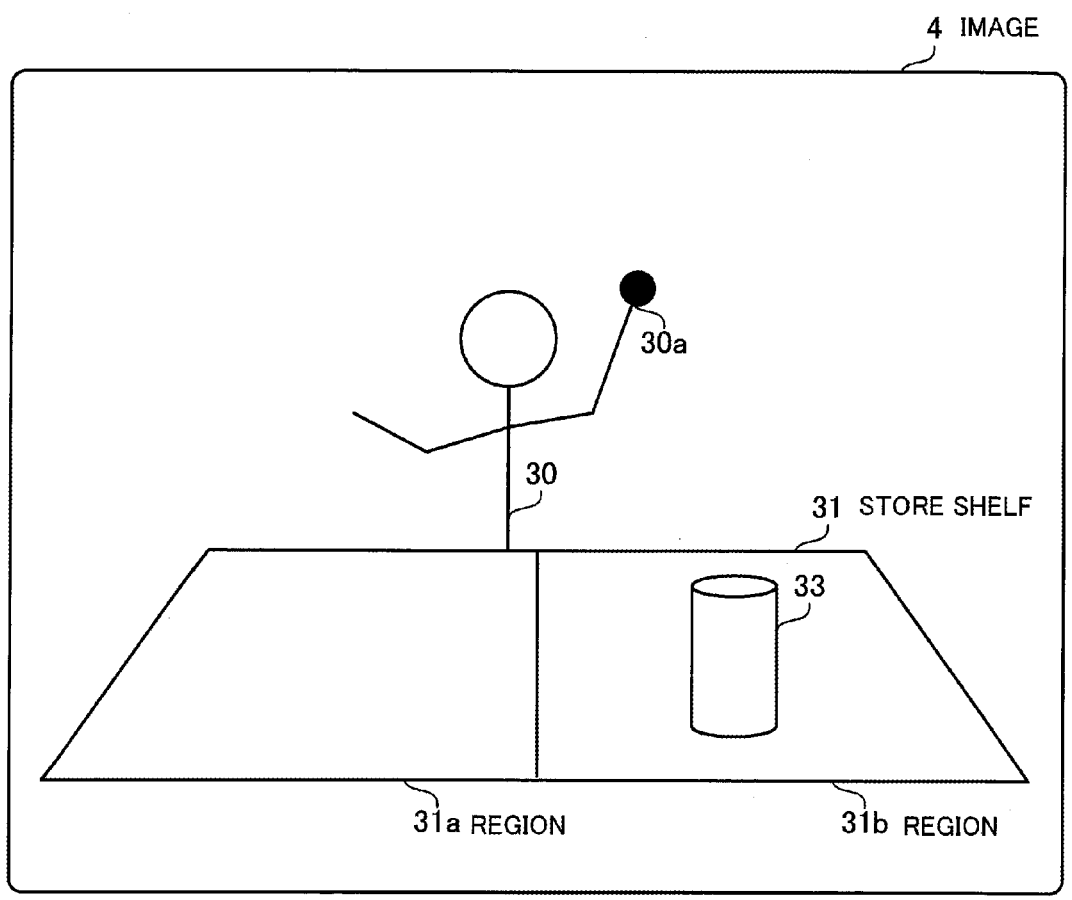
FIG. 6 illustrates an example of determination of whether a hand has entered into an article location region.

FIG. 6 illustrates an example of determination of whether a hand has entered into an article location region. The image 4 is an image captured by the sensor device 100. The objects in the image 4 include a customer 30, a store shelf 31, and an article 33. The store shelf 31 is installed at the front of the sensor device 100. The regions 31a, 31b are each a set region corresponding to an article location region on the store shelf 31 on which an individual article is to be located. The regions 31a, 31b are set on the image arbitrarily by the user. For example, the article 33 is located in the article location region corresponding to the region 31b. The customer 30 is present at the far side of the store shelf 31 in relation to the sensor device 100. The wrist 30a of the customer 30 is not included in any of the regions 31a, 31b, which are the article location regions. If the movement determining apparatus 200 receives the data of the image 4 from the sensor device 100, the movement determining apparatus 200 determines that the hand of the customer 30 has not entered into the article location regions corresponding to the regions 31a, 31b, because the position of the wrist 30a of the customer 30 appearing in the received image 4 is not included in the regions 31a, 31b.

Figure 7:
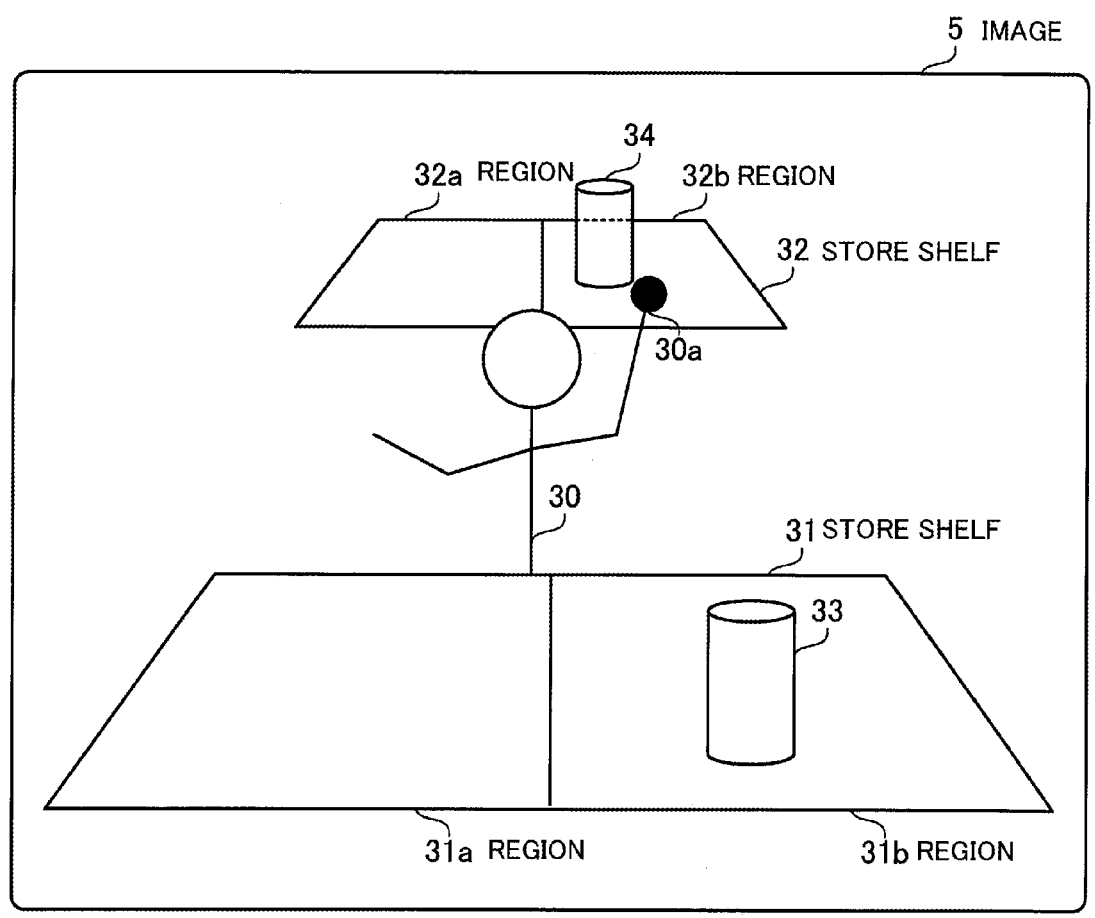
FIG. 7 illustrates an example of determination of whether a hand has entered into an article location region (continuation)

FIG. 7 illustrates an example of determination of whether a hand has entered into an article location region (continuation). In the description of FIG. 7, the same description as that of FIG. 6 will not be repeated. The image 5 is an image of the store shelves 31, 32 installed as in FIG. 3, which is captured by the sensor device 100. The objects in the image 5 include the store shelf 32 and the article 34 in addition to the objects in the image 4. The store shelf 32 is installed in the forward direction of the sensor device 100, and at the far side of the store shelf 31 in relation to the sensor device 100. The regions 32a, 32b are each a set region corresponding to an article location region on the store shelf 32 on which an individual article is to be located. The regions 32a, 32b are set on the image arbitrarily by the user. For example, the article 33 is located in the article location region corresponding to the region 31b, and the article 34 is located in the article location region corresponding to the region 32b. The customer 30 is present at the far side of the store shelf 31 in relation to the sensor device 100, and at the near side of the store shelf 32 in relation to the sensor device 100. The wrist 30a of the customer 30 is included in the region 32b. Note that the orientation of the customer 30 is not known at this point.

If the movement determining apparatus 200 receives the data of the image 5 from the sensor device 100, the customer 30 can be either in a state where the customer 30 faces in the opposite direction to the sensor device 100 and brings his or her hand into the region 32b to take the article 34 in his or her hand, or in a state where the customer 30 faces in the direction toward the sensor device 100 and just raises his or her hand. In the latter case, the hand of the customer 30 actually has not entered into the article location region corresponding to the region 32b. However, since the position of the wrist 30a appearing in the image 5 is included in the region 32b, the movement determining apparatus 200 had a potential risk of erroneously determining that the hand of the customer 30 has entered into the article location region corresponding to the region 32b. As in an example of FIG. 7, when the article location region is present on the object at the far side of the customer 30 in relation to the sensor device 100, the movement determining apparatus 200 was sometimes unable to accurately determine whether the hand of the customer 30 has entered into the article location region. Therefore, the movement determining apparatus 200 determines the orientation of the customer 30 appearing in the image, and limits, on the basis of the determined orientation of the customer 30, the set region for determining whether the hand of the customer 30 has entered thereinto, for the purpose of preventing the erroneous determination.

In and after FIG. 8, description will be made of the method of determining whether a hand of the customer has entered into a certain article location region, on the basis of position relationship between a target region and a wrist of the customer. The "target region" means a set region corresponding to the article location region, which is limited on the basis of the orientation of the customer. For the target region, position relationship with the wrist of the customer is determined.

Figure 8:
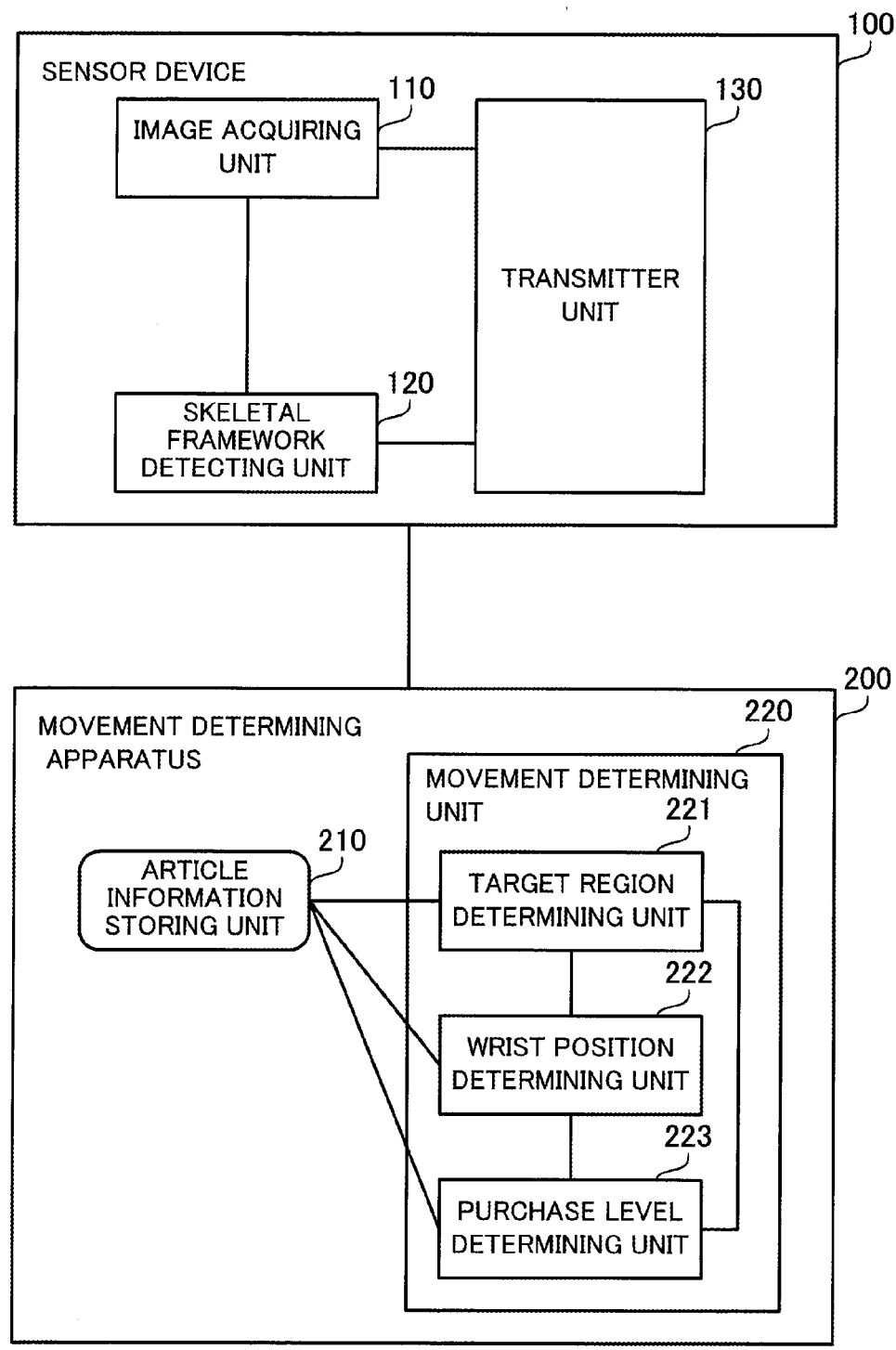
FIG. 8 is a block diagram of exemplary functions of a sensor device and a movement determining apparatus.

FIG. 8 is a block diagram of exemplary functions of the sensor device and the movement determining apparatus. The sensor device 100 includes an image acquiring unit 110, a skeletal framework detecting unit 120, and a transmitter unit 130. The image acquiring unit 110 acquires the image data captured by the image capturing camera 104 at predetermined time intervals. The skeletal framework detecting unit 120 detects positions of predetermined areas of the skeletal framework, such as a wrist, an elbow, a head, and a shoulder of a person appearing in the image, on the basis of the image data and the depth information from the depth sensor 105. The skeletal framework detecting unit 120 detects the positions of the areas of the skeletal framework each time the image acquiring unit 110 acquires the image data, and generates the skeletal framework information including the position information of each area. The position information of each area includes the information indicating the position on the image, and the information indicating the distance (the depth) from the sensor device 100 to each area. Note that, when a plurality of persons appear in the image, the skeletal framework detecting unit 120 generates the skeletal framework information for each person. The distance (the depth) from the sensor device 100 to each area is sometimes referred to as "depth of skeletal framework (for example, a head)". The transmitter unit 130 transmits the captured image data and the skeletal framework information of the customer appearing in the image to the movement determining apparatus 200. Note that the image acquiring unit 110, the skeletal framework detecting unit 120, and the transmitter unit 130 are realized, for example, by the processor 101 executing predetermined programs.

The movement determining apparatus 200 includes an article information storing unit 210 and a movement determining unit 220. The article information storing unit 210 stores an article information table containing information relevant to the articles dealt in the store in which the movement determining system 3 is utilized. The information relevant to the articles includes the position information indicating the ranges of the regions corresponding to the articles, on the image where the articles are located. The article information storing unit 210 is realized as a non-volatile storage region in the HDD 203 or the like, for example. The movement determining unit 220 determines whether a hand of the customer has entered into a certain article location region, on the basis of the information received from the sensor device 100. The movement determining unit 220 includes a target region determining unit 221, a wrist position determining unit 222, and a purchase level determining unit 223. The target region determining unit 221 determines the orientation of the customer with reference to the skeletal framework information of the customer which is received from the sensor device 100. Also, the target region determining unit 221 limits the set regions set in the article information table, to the target regions for determining the position relationship with the wrist of the customer, on the basis of the determined orientation of the customer. The wrist position determining unit 222 determines whether the hand of the customer has entered into the article location region corresponding to the limited target region, on the basis of whether the position of the wrist of the customer on the image is included in the target region. The purchase level determining unit 223 determines the purchase level into which the purchase movement of the customer is classified, on the basis of the determination result of the orientation of the customer by the target region determining unit 221 and the determination result by the wrist position determining unit 222. Note that the article information storing unit 210 is realized as a storage region in the RAM 202 or the HDD 203, for example. Also, the target region determining unit 221, the wrist position determining unit 222, and the purchase level determining unit 223 are realized by the processor 201 executing predetermined programs for example.

Figure 9:
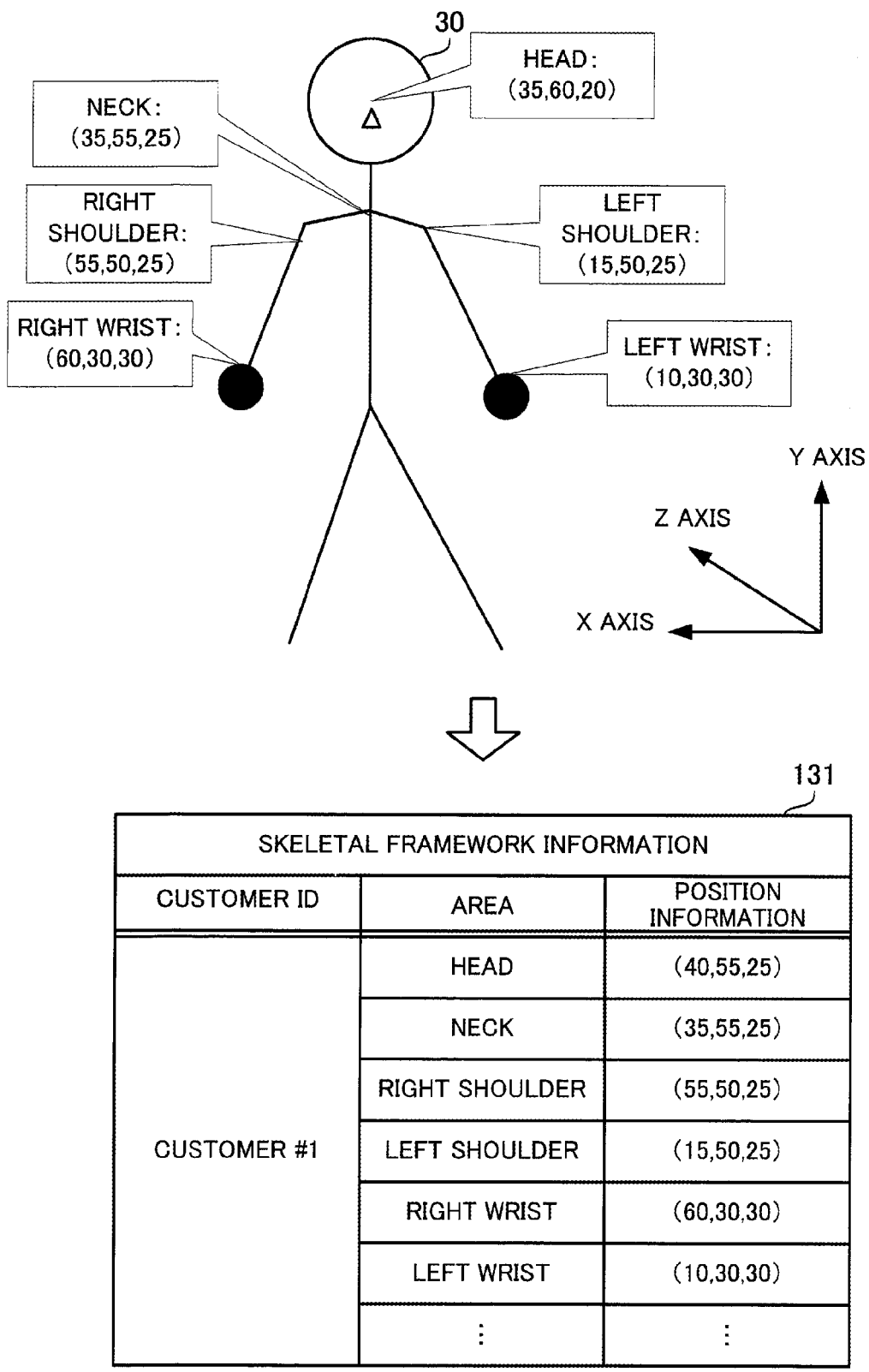
FIG. 9 illustrates an example of a skeletal framework information.

Next, with reference to FIGS. 9 to 10, description will be made of the information and the table used in the movement determining system 3. FIG. 9 illustrates an example of the skeletal framework information. The skeletal framework information 131 is information indicating each skeletal framework position such as a head and a joint of a wrist of a customer. The skeletal framework information 131 is generated by the skeletal framework detecting unit 120. The skeletal framework information 131 includes columns of customer ID (Identification), area, and position information. In the column of the customer ID, an identifier for identifying the customer appearing in the image is set. In the column of the area, information indicating the type of the area is set. In the column of the position information, the position information of the area is set. In the movement determining system 3, the position information is expressed by "(position in X-axis direction, position in Y-axis direction, position in Z-axis direction)". X axis is the axis in the transverse direction orthogonal to the optical axis of the image capturing camera 104, in which the positive direction is the left direction from the viewpoint of the image capturing camera 104. Y axis is the axis of the vertical direction orthogonal to the optical axis of the image capturing camera 104, in which the positive direction is the upward direction from the viewpoint of the image capturing camera 104. Z axis is the axis of the direction of the optical axis of the image capturing camera 104, in which the positive direction is the direction in which the image capturing camera 104 faces. That is, the coordinates of the skeletal framework on the image are expressed by the coordinates of X axis and Y axis, and the depth of the skeletal framework is expressed by the coordinate of Z axis. For example, as illustrated in FIG. 9, as the area of the skeletal framework, the head, the neck, the right shoulder, the left shoulder, the right wrist, the left wrist, etc. are detected. When the coordinates of the head of the customer 30 on the image are "(35, 60)" and the depth is "20", "(35, 60, 20)" is set in the column of the position information at a row corresponding to the "head" of the customer 30 in the skeletal framework information 131. Note that the position information of the skeletal framework may be expressed by another method such as a latitude, a longitude, and a height, instead of the above expression method.

FIG. 10 illustrates an example of the article information table. In the article information table 211, the set regions that correspond to the article location regions in the store are set on the image for each article. For example, the set region set on the image for each article is utilized for determining whether the wrist of the customer enters and exits the set region. The article information table 211 is stored in the article information storing unit 210. The article information table 211 includes columns of article ID, region information, and type. In the column of the article ID, an identifier for identifying the articles dealt in the store is set. In the column of the region information, the information indicating the set region corresponding to the article location region where the articles are located is set. In the movement determining system 3, the set region is presumed to be a quadrangle. Accordingly, the information indicating the set region is expressed by the coordinates of the four corners of the set region. The coordinates of the four corners are expressed by "(position in X-axis direction, position in Y-axis direction)", respectively. X axis is the axis in the transverse direction in the image captured by the image capturing camera 104, in which the positive direction is the left direction. Y axis is the axis of the vertical direction in the image captured by the image capturing camera 104, in which the positive direction is the upward direction. Note that the set region is not limited to the quadrangle, but may be a circle or an ellipse. Also, when the set region is rectangular for example, the information indicating the set region may be expressed only by the coordinates of the upper right corner and the lower left corner of the set region, for example. In the column of the type, information indicating the type of position relationship between the article location region corresponding to the set region and the customer is set. For example, when the article location region is at the near side of the customer in relation to the sensor device 100, "near" is set in the column of the type. When the article location region is at the far side of the customer in relation to the sensor device 100, "far" is set in the column of the type. Note that, in addition to the above columns, the article information table 211 may include article name, information indicating the number of times when the article is taken in the hand, etc.

Figure 11:
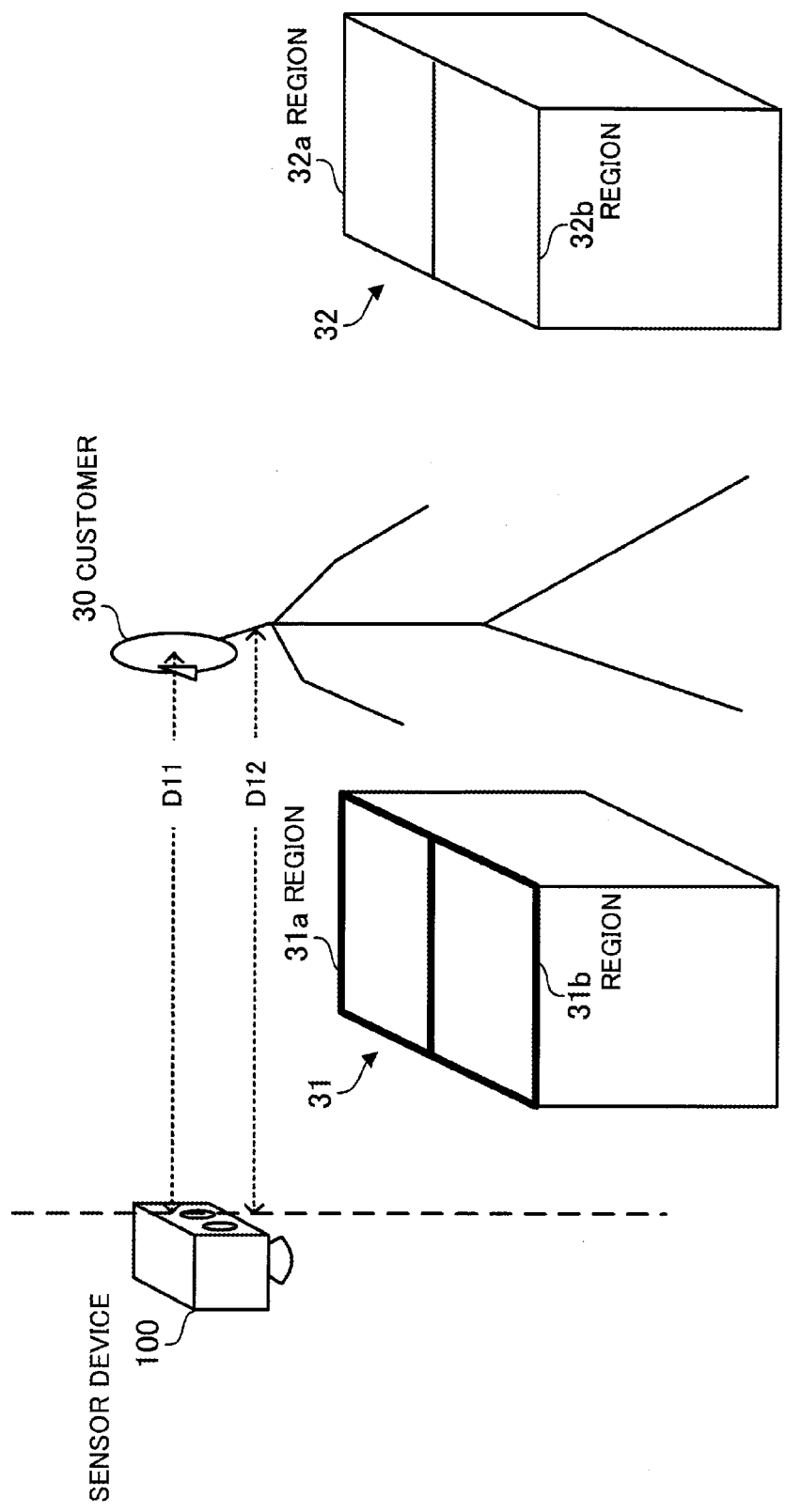
FIG. 11 illustrates an example of limitation of a target region when an orientation of a customer is a near-side direction.
Figure 12:
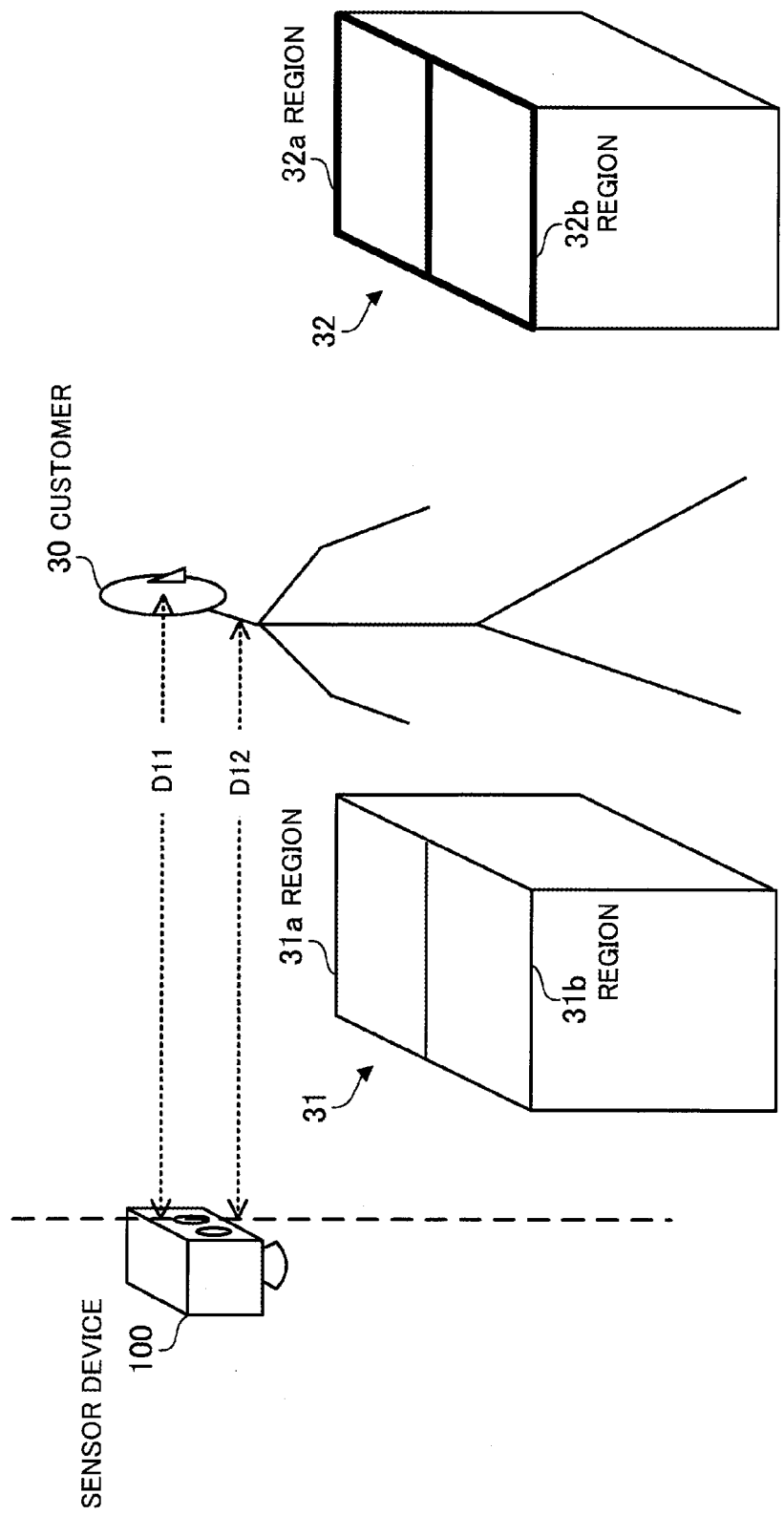
FIG. 12 illustrates an example of limitation of a target region when an orientation of a customer is a far-side direction.

Next, with reference to FIGS. 11 and 12, description will be made of the method of determining the orientation of the customer. The locations of the store shelves 31, 32 in FIGS. 11 and 12 are the same as the locations in FIGS. 3 and 7. That is, in FIGS. 11 and 12, respective article location regions corresponding to the articles (for example, the region 31a) are set in the same way as those on the image 5 in FIG. 7.

FIG. 11 illustrates an example of limitation of the target region when the orientation of the customer is in the near-side direction. In the description of FIG. 11, the same description as that of FIG. 3 will not be repeated. The regions 31a, 31b in FIG. 11 are identical with the set regions 31a, 31b set on the image in FIG. 7, which are on the top face of the store shelf 31. In the same way, the regions 32a, 32b in FIG. 11 are identical with the set regions 32a, 32b set on the image in FIG. 7, which are on the top face of the store shelf 32. The customer 30 faces in the direction toward the sensor device 100. The depth D11 is the depth of the head of the customer 30, and the depth D12 is the depth of the neck of the customer 30. The sensor device 100 measures the depth D11 and the depth D12 and transmits the measured depths to the movement determining apparatus 200. The movement determining apparatus 200 compares the depth D11 and the depth D12, and determines the orientation of the customer 30. In FIG. 11, the head of the person (for example, the customer 30) is positioned frontwardly of the neck, because of the structure of the skeletal framework of a person. Hence, when the depth D11 is shorter than the depth D12, the movement determining apparatus 200 determines that the orientation of the customer 30 is in the direction toward the sensor device 100. In the following, the situation in which the orientation of the customer 30 is in the direction toward the sensor device 100 is sometimes expressed by the phrase "the orientation of the customer 30 is in the near-side direction". When the movement determining apparatus 200 determines that the orientation of the customer 30 is in the near-side direction, the movement determining apparatus 200 limits the target region to the regions 31a, 31b corresponding to the article location regions present at the near side of the customer 30 in relation to the sensor device 100. In other words, the regions 32a, 32b are excluded from the target region. Accordingly, as in the state illustrated in FIG. 7, even if the position of the wrist of the customer 30 is included in the region 32b, the movement determining apparatus 200 does not determine that the hand of the customer 30 has entered into the article location region corresponding to the region 32b. Thereby, the erroneous determination that the hand has entered thereinto is prevented.

FIG. 12 illustrates an example of limitation of the target region when the orientation of the customer is in the far-side direction. In the description of FIG. 12, the same description as that of FIG. 11 will not be repeated. The customer 30 faces in the opposite direction to the sensor device 100. The sensor device 100 measures the depth D11 and the depth D12 and transmits the measured depths to the movement determining apparatus 200. The movement determining apparatus 200 compares the depth D11 and the depth D12, and determines the orientation of the customer 30. Since the head of a person is positioned frontwardly of the neck as described in FIG. 11, when the depth D11 is longer than the depth D12 as illustrated in FIG. 12, the movement determining apparatus 200 determines that the orientation of the customer 30 is in the opposite direction to the sensor device 100. In the following, the situation in which the orientation of the customer 30 is in the opposite direction to the sensor device 100 is sometimes expressed by the phrase "the orientation of the customer 30 is in the far-side direction". When the movement determining apparatus 200 determines that the orientation of the customer 30 is in the far-side direction, the movement determining apparatus 200 includes, into the target region, at least the regions 32a, 32b corresponding to the article location regions present at the far side of the customer 30 in relation to the sensor device 100. Accordingly, as in the state illustrated in FIG. 7, when the position of the hand of the customer 30 is included in the region 32b, the movement determining apparatus 200 determines that the hand of the customer 30 has entered into the article location region corresponding to the region 32b. Since the customer 30 is presumed to face toward the article location region corresponding to the region 32b, the possibility of erroneous determination that the hand has not entered is low. Note that, in an example of FIG. 12, the movement determining apparatus 200 may limit the target region to the regions 32a, 32b, and exclude the regions 31a, 31b from the target region. Thereby, the process for monitoring the entrance of the hand into the regions 31a, 31b is needless to be executed, which reduces the process load.

As described in FIGS. 11 and 12, the movement determining apparatus 200 determines the orientation of the customer 30 on the basis of the depth of the head (the depth D11) and the depth of the neck (the depth D12) of the customer 30. Since these depths D11, D12 are measured by the sensor device 100, the movement determining apparatus 200 is able to determine the orientation of the customer 30 by a simple process of comparing coordinates of the depths D11, D12. Also, since the existing sensor devices can be used to measure the depths D11, D12, the introduction of the overall system becomes easy.

Further, for example, as compared to the method of determining the orientation of the customer 30 on the basis of the sight line direction of the customer 30, there is an advantage of being able to determine the orientation of the customer 30, even when the customer 30 wears glasses or sunglasses and the sight line is unable to be captured.

Also, in order to detect the sight line direction and determine the orientation of the customer 30, an image capturing device needs to have a high resolution that allows detection of position change of eyeballs, as well as a high accuracy that allows not only the face but also other areas of the customer 30 to appear in the image. Some of image capturing devices of this kind have a large external shape, which necessitates a large installation space. Further, when the image capturing device is large, the psychological burden to the customer who is the object of the image capturing in the store can be large. The image capturing device of that high accuracy is not needed for measuring the depths D11, D12, which reduces the installation space of the sensor device.

Also, the movement determining apparatus 200 selects the target regions from among a plurality of set regions, on the basis of the orientation of the customer 30. This prevents the erroneous determination of whether the hand has entered into the article location region, which has been described with reference to FIG. 7, so as to improve the determination accuracy. Also, since the target region for determining the position relationship with the wrist of the customer 30 is limited, the process of determining whether the hand of the customer 30 has entered thereinto is executed efficiently to shorten the processing time.

Figure 13:
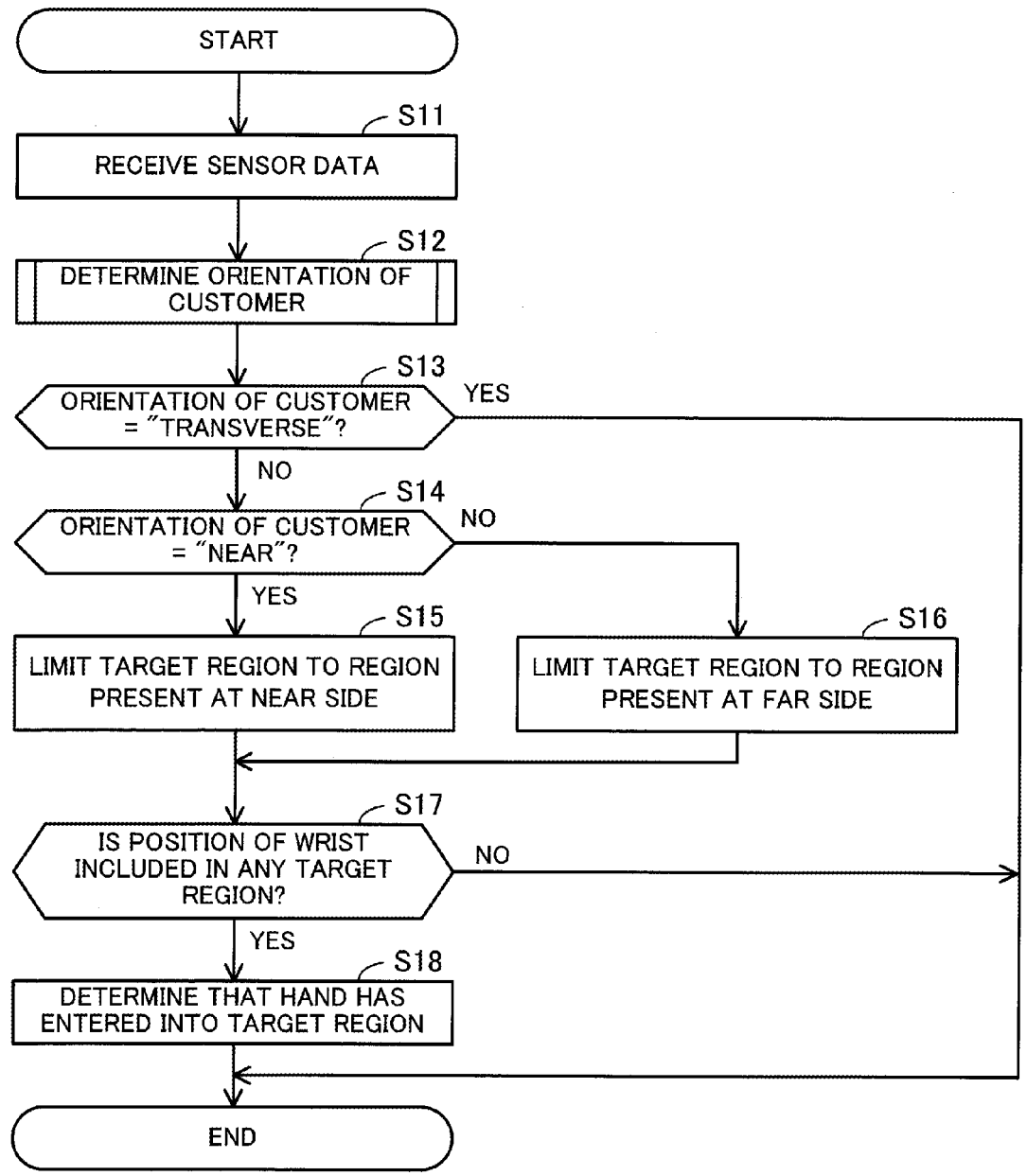
FIG. 13 is a flowchart illustrating an example of a process to determine whether a customer has taken an article in his or her hand.

Next, with reference to FIGS. 13 and 14, description will be made of the process executed by the movement determining apparatus 200. FIG. 13 is a flowchart illustrating an example of the process to determine whether the customer has taken an article in his or her hand. The execution of the process of FIG. 13 is triggered by reception of information relevant to an image from the sensor device 100. In the following, the process illustrated in FIG. 13 is described in the order of the step numbers. The information relevant to the image is received at predetermined time intervals.

(S11) The target region determining unit 221 receives the sensor data from the sensor device 100. The received data includes at least captured image data, and skeletal framework information 131 of the customer (the customer 30) appearing in the image.

(S12) The target region determining unit 221 determines the orientation of the customer 30. The detail will be described later, with reference to FIG. 14.

(S13) The target region determining unit 221 determines whether the orientation of the customer 30 is "transverse". If the orientation of the customer 30 is "transverse", the process ends. When the orientation of the customer 30 is not "transverse" (i.e., "near" or "far"), the process proceeds to step S14. Note that, if the orientation of the customer 30 is "transverse", any of the set regions is not included in the target region, and the determination process of whether a hand has entered into the article location region is not executed. Note that, when the set regions are set on the article location regions that are present at the right or left of the region between the store shelf 31 and the store shelf 32 from a viewpoint of the sensor device 100, these set regions may be selected as the target region, for example.

(S14) The target region determining unit 221 determines whether the orientation of the customer 30 is "near". If the orientation is "near", the process proceeds to step S15. If the orientation is not "near" (i.e., "far"), the process proceeds to step S16.

(S15) The target region determining unit 221 limits the target region to the set regions corresponding to the article location regions present at the near side of the customer 30, from among the set regions. Specifically, the target region determining unit 221 searches the article information table 211 for the record of the "near" type, and limits the target region to the regions of region information of each searched record.

(S16) The target region determining unit 221 limits the target region to the set regions corresponding to the article location regions present at the far side of the customer 30, from among the set regions. Specifically, the target region determining unit 221 searches the article information table 211 for the record of the "far" type, and limits the target region to the region of the region information of each searched record. Note that, in step S16, the target region determining unit 221 may select the set regions corresponding to the article location regions at both of the near side and the far side of the customer 20, as the target region.

(S17) The wrist position determining unit 222 determines whether the position of the wrist of the customer 30 is included in one of the target regions limited in one of steps S15, S16. The position of the wrist of the customer 30 is acquired by searching the skeletal framework information 131 for the record that has the customer ID of the customer 30 and the area of "right wrist" or "left wrist" and reading out the position information of each searched record. In the following, "position of wrist" includes the position of the right wrist and the position of the left wrist. If the position of the wrist is included in one of the target regions, the process proceeds to step S18. If the position of the wrist is not included in any of target regions, the process ends.

(S18) The wrist position determining unit 222 determines that the hand of the customer 30 has entered into the article location region corresponding to the target region where the wrist of the customer 30 is positioned. Note that the wrist position determining unit 222 may output, to the log file and the display 21, the data indicating that the hand of the customer 30 has entered into the article location region, as well as the information of the article corresponding to the article location region into which the hand of the customer 30 has entered, for example.

Figure 14:
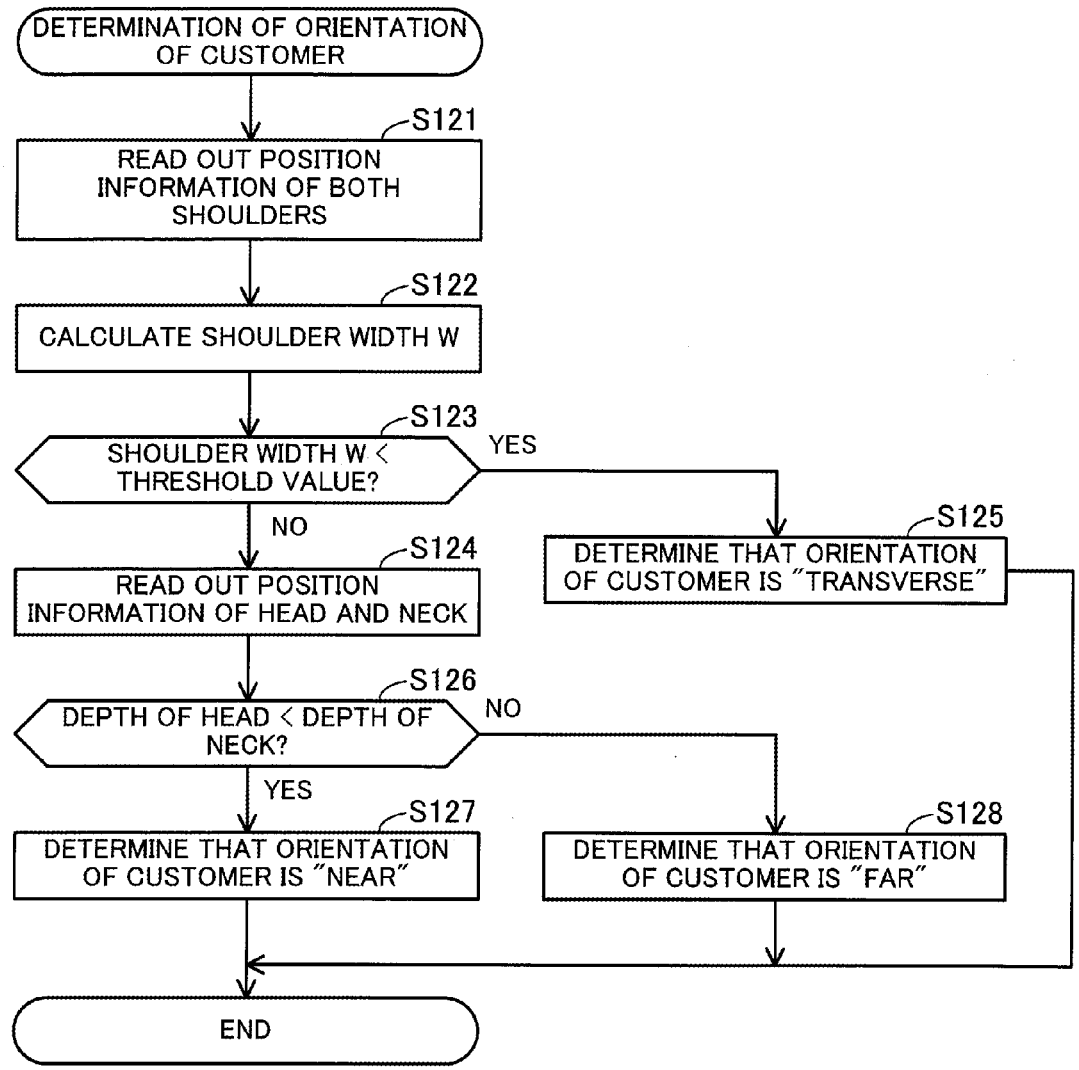
FIG. 14 is a flowchart illustrating an example of a process to determine an orientation of a customer.

FIG. 14 is a flowchart illustrating an example of the process to determine the orientation of the customer. FIG. 14 is executed in step S12 of FIG. 13. In the following, the process illustrated in FIG. 14 is described in the order of the step numbers.

(S121) The target region determining unit 221 reads out the position information of the both shoulders (i.e., the right shoulder and the left shoulder) on the image, from the skeletal framework information 131 received in step S11 of FIG. 13. Specifically, the target region determining unit 221 searches the skeletal framework information 131 for the record that has the customer ID of the customer 30 and the area of "right shoulder" or "left shoulder", and read out the position information in the X-axis direction and the Y-axis direction from among the position information of each searched record.

(S122) The target region determining unit 221 calculates the distance between the both shoulders (i.e., the right shoulder and the left shoulder) on the image as the shoulder width W, on the basis of the position information that is read out. For example, the shoulder width W is calculated by $$W=((X2-X1)^2+(Y2-Y1)^2)^{1/2}$$

where
the position of the right shoulder is (X1, Y1), and
the position of the left shoulder is (X2, Y2).

(S123) The target region determining unit 221 determines whether the calculated shoulder width W is shorter than a threshold value. If the shoulder width W is shorter than the threshold value, the process proceeds to step S125. If the shoulder width W is longer than the threshold value, the process proceeds to step S124.

(S124) The target region determining unit 221 reads out the position information of the head and the position information of the neck, from the skeletal framework information 131 received in step S11 of FIG. 13. Specifically, the target region determining unit 221 searches the skeletal framework information 131 for the record that has the customer ID of the customer 30 and the area of "head" or "neck", and reads out the position information of the searched record. The customer 30 is the customer appearing in the image received in step S11 of FIG. 13.

(S125) The target region determining unit 221 determines that the orientation of the customer 30 is "transverse".

(S126) The target region determining unit 221 determines whether the depth of the head of the customer 30 is shorter than the depth of the neck. The depths of the head and the neck are acquired from the position in the Z-axis direction in the position information read out in step S124. If the depth of the head is shorter than the depth of the neck, the process proceeds to step S127. If the depth of the head is longer than the depth of the neck, the process proceeds to step S128.

(S127) The target region determining unit 221 determines that the orientation of the customer 30 is "near".

(S128) The target region determining unit 221 determines that the orientation of the customer 30 is "far".

According to the process of above FIGS. 13 and 14, the target region determining unit 221 determines the orientation of the customer 30 on the basis of the depth of the head and the depth of the neck of the customer 30. Thereby, the orientation of the customer 30 is determined in a simple manner.

Also, the target region determining unit 221 selects the target region from among the set regions, on the basis of the orientation of the customer 30. Thereby, the erroneous determination of whether the hand has entered into the article location region is prevented to improve the determination accuracy. Also, since the target region is limited to reduce the processing amount for determining the position relationship with the wrist of the customer 30, the processing time is shortened and the process load is reduced.

Also, the target region determining unit 221 determines whether the orientation of the customer 30 is the transverse direction, on the basis of the width of the both shoulders of the customer 30. If the orientation is the transverse direction, the target region does not include at least the set region corresponding to the article location region present at the far side of the customer 30 in relation to the sensor device 100, and the set region corresponding to the article location region present at the near side of the customer 30. This is because it is difficult to accurately determine whether the set region corresponding to the article location region of the near side in relation to the sensor device 100 is to be set as the target region, or the set region corresponding to the article location region of the far side in relation to the sensor device 100 is to be set as the target region. If the orientation is the transverse direction, the above process prevents the erroneous determination that the hand has entered into those set regions. For example, when the store shelves are located as in the image 5 of FIG. 7 and the orientation of the customer 30 is the transverse direction, the erroneous determination that the orientation of the customer 30 is the near side or the far side is prevented.

Note that, instead of determining whether the distance between the both shoulders is shorter than the threshold value, the target region determining unit 221 may determine that the orientation of the customer 30 is "transverse" when the difference between the depth of the head and the depth of the neck of the customer 30 is within a certain range (for example, from −α to +α).

Figure 15:
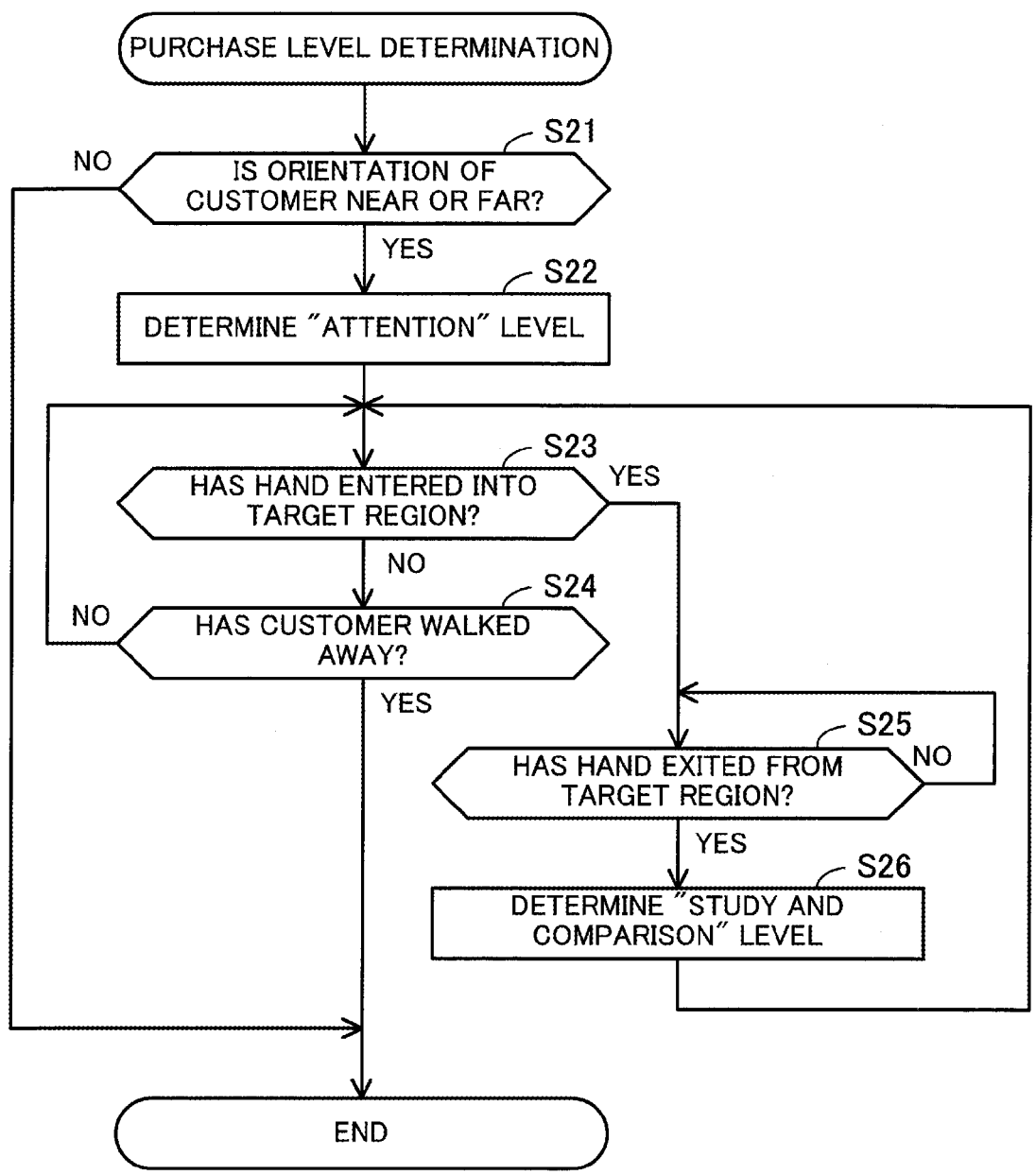
FIG. 15 is a flowchart illustrating an example of a determination process of a purchase level.

FIG. 15 is a flowchart illustrating an example of the determination process of the purchase level. In the following, the process illustrated in FIG. 15 is described in the order of the step numbers.

(S21) The purchase level determining unit 223 determines whether the orientation of the customer appearing in the captured image is the near side or the far side, on the basis of the determination result by the target region determining unit 221. If the orientation of the customer is in the near side or the far side, the process proceeds to step S22. If the orientation of the customer is neither the near side nor the far side (for example, the transverse direction), the process ends. Note that the purchase level determining unit 223 may proceed to step S22, if the moving speed of the customer on the image is equal to or slower than a predetermined speed threshold value and the orientation of the customer is the near side or the far side, for example.

(S22) The purchase level determining unit 223 determines that the purchase level of the customer is "attention" level. For example, the purchase level determining unit 223 outputs information indicating that the purchase level is "attention" level, together with the identification information of the set region set on the store shelf which is present in the direction that the customer faces, and the identification information of the customer. Note that the set region set on the store shelf which is present in the direction that the customer faces can be the set region that is set as the target region in step S15 or step S16 of FIG. 13 at this time point. In this case, the target region needs to be limited only to the set region corresponding to the article location region present at the far side of the customer 30 in step S16, as described with reference to FIG. 13.

(S23) On the basis of the determination result of step S18 of FIG. 13, the purchase level determining unit 223 determines whether the hand of the customer has entered into one of the set regions corresponding to the article location regions present in the direction that the customer faces (i.e., the set regions that are set as the target regions). If the hand of the customer has entered into one of the target regions, the process proceeds to step S25. If the hand of the customer has not entered into any of the target regions, the process proceeds to step S24.

(S24) The purchase level determining unit 223 determines whether the customer has walked away. For example, if the customer becomes undetectable from the captured image, the purchase level determining unit 223 determines that the customer has walked away. Alternatively, if the moving speed of the customer exceeds the speed threshold value used in step S21, the purchase level determining unit 223 may determine that the customer has walked away. If the customer has walked away, the process ends. If the customer has not walked away, the process proceeds to step S23.

(S25) On the basis of the determination result of step S18 of FIG. 13, the purchase level determining unit 223 determines whether the hand has exited to the outside from the target region that the purchase level determining unit 223 has determined that the hand has entered into in step S23. Until the purchase level determining unit 223 determines that the hand has exited from the target region, the process of step S25 is repeated at constant time intervals. Then, if the purchase level determining unit 223 determines that the hand has exited from the target region, the process proceeds to step S26.

(S26) The purchase level determining unit 223 determines that the purchase level of the customer is "study and comparison" level. For example, the purchase level determining unit 223 outputs information indicating that the purchase level is "study and comparison" level, together with the identification information of the article corresponding to the set region that the purchase level determining unit 223 has determined that the hand has exited from, and the identification information of the customer. Thereafter, the process proceeds to step S23.

According to the process of above FIG. 15, the purchase level into which the purchase movement of the customer is classified is determined based on the orientation of the customer and the determination result of whether the hand of the customer has entered into the article location region. For example, a store shelf that the customer pays attention to is determined based on the determination result of the orientation of the customer. Also, as illustrated in above FIGS. 13 and 14, since the target region is selected from among the set regions on the basis of the orientation of the customer, the article that the customer is presumed to have conducted "comparison and study" is accurately determined.

Note that the determination process of the purchase level illustrated in FIG. 15 is just an example. The purchase movement of the customer may be classified by various classification methods, using the orientation of the customer and the determination result of whether the hand of the customer has entered into the article location region. For example, the purchase level determining unit 223 may determine that the customer has taken the corresponding article in his or her hand, when determining that the hand has exited in step S25 of FIG. 15.

Also, the above second embodiment has described an example in which the set region for determining whether the hand has entered thereinto is selected based on the determination result of the orientation of the customer. However, the embodiment is not limited thereto, but the set region for conducting various processes may be selected based on the determination result of the orientation of the customer. For example, the set region for determining whether the customer has taken an article in his or her hand may be selected. Also, the set region for determining presence or absence of an article, or the set region for determining whether an article is located in a preferable state (for example, in a preferable orientation) may be selected.

Third Embodiment

Next, description will be made of the movement determining system of the third embodiment. In the movement determining system 3 of the second embodiment, the depths of the neck and the head of the customer 30 are compared to determine whether the head is positioned frontwardly of the neck in order to determine the orientation of the customer 30. This method of determining the orientation is performed under the premise that the depths of the neck and the head are measured in the substantially horizontal direction. Hence, if the upper body of the customer is substantially vertical, the error in the depth used in the determination (i.e., the distance from the sensor device 100) increases as the inclination of the optical axis of the sensor device 100 relative to the vertical direction increases, so as to deteriorate the determination accuracy. Therefore, in the movement determining system of the third embodiment, the movement determining apparatus 200 of the second embodiment is modified as in the following. In the third embodiment, the movement determining apparatus 200 corrects the depths of the neck and the head received from the sensor device 100, to the horizontal component of the respective depths (i.e., the distances in the horizontal direction from the sensor device 100 to the respective areas). Then, the orientation of the customer is determined on the basis of the depths of the neck and the head after the correction.

Figure 16:
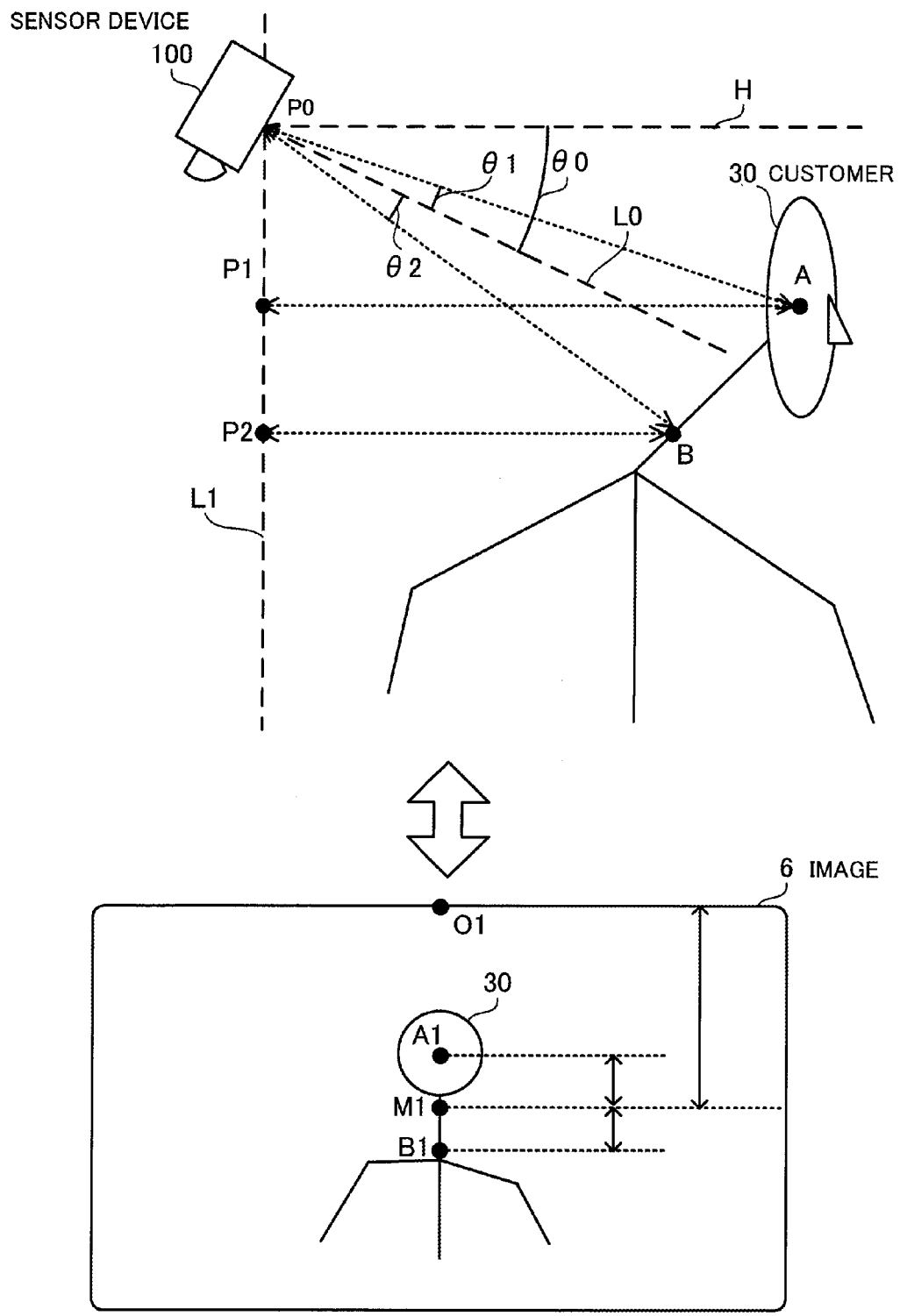
FIG. 16 illustrates an example of conversion of a distance between a sensor device and a skeletal framework in a third embodiment.
Figure 17:
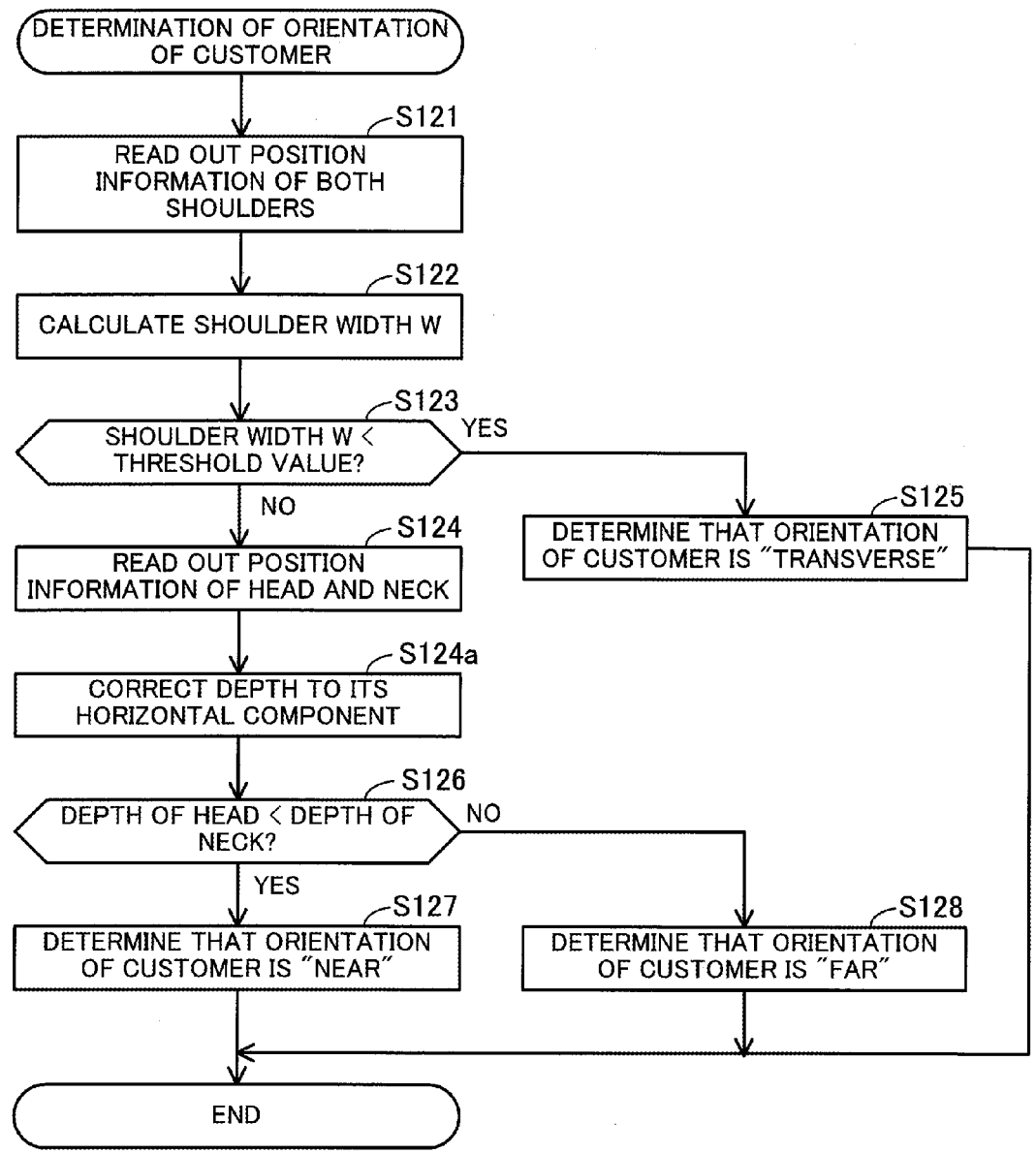
FIG. 17 is a flowchart illustrating an example of a process to determine an orientation of a customer in the third embodiment.

In the following, with reference to FIGS. 16 and 17, description will be made of the movement determining apparatus 200 of the third embodiment. In FIGS. 16 and 17, the difference from the second embodiment will be described, and the same description of the configuration and process as that of the second embodiment will not be repeated.

FIG. 16 illustrates an example of conversion of the distance between the sensor device and the skeletal framework in the third embodiment. The line segment AP0 is a line segment linking the head of the customer 30 and the sensor device 100. The distance of the line segment AP0 is expressed by the depth of the head of the customer 30. The line segment BP0 is a line segment linking the neck of the customer 30 and the sensor device 100. The distance of the line segment BP0 is expressed by the depth of the neck of the customer 30. The line segment AP1 is a line drawn from the point A perpendicularly to the vertical line L1 that is drawn from the point P0 to the ground surface. The line segment BP2 is a line drawn from the point B perpendicularly to the vertical line L1 that is drawn from the point P0 to the ground surface. That is, the line segment AP1 is the horizontal component of the depth of the head of the customer 30, and the line segment BP2 is the horizontal component of the depth of the neck. The angle $\theta 0$ is the angle of the optical axis of the lens of the image capturing camera 104 (the optical axis L0 of the sensor device 100) relative to the horizontal plane H. The angle $\theta 0$ is the depression angle of the sensor device 100. The angle $\theta 1$ is the angle between the line segment AP0 and the optical axis L0 of the sensor device 100 in a vertical direction. The angle $\theta 2$ is the angle between the line segment BP0 and the optical axis L0 of the sensor device 100 in a vertical direction.

The image 6 is an image captured by the sensor device 100 located as in the upper portion of FIG. 16. The point A1 is the position of the head of the customer appearing in the image 6, and the point B1 is the position of the neck of the customer 30. The point M1 is the center of the image 6. That is, the point M1 is a point on the optical axis L0 of the sensor device 100. The point O1 is the midpoint of the top edge of the image 6. That is, the point O1 is a point on the boundary of the field of view in the upward direction of the sensor device 100.

As in the following, the target region determining unit 221 corrects the depths of the head and the neck of the customer 30, to the horizontal components of the depths. First, the target region determining unit 221 converts Y coordinate of the head of the customer 30 into the angle $\theta 1$, and converts Y coordinate of the neck of the customer 30 into the angle $\theta 2$. The conversion of these angles may be executed on the basis of the correspondence relationship between the number of pixels from the center point M1 of the image 6 and the angle relative to the optical axis L0. The correspondence relationship between the number of pixels and the angle is predetermined based on the angle $\theta 0$ and the resolution of the image. Also, the conversion of the above angles may be executed, for example, by calculating the angles relative to the optical axis L0 in accordance with "(the view angle of the sensor device 100/2)×(distance A1M1/distance M1O1)= the angle $\theta 1$" and "(the view angle of the sensor device 100/2)×(distance B1M1/distance M1O1)=the angle $\theta 2$". "Distance A1M1" means the distance between the point A1 and the point M1 in the vertical direction. "Distance B1M1" means the distance between the point B1 and the point M1 in the vertical direction. "Distance M1O1" means the distance between the point M1 and the point O1 in the vertical direction.

Next, the target region determining unit 221 calculates the horizontal component of the depth of the head (the distance of AP1) on the basis of the angles $\theta 0$, $\theta 1$ and the depth of the head of the customer 30. Specifically, the target region determining unit 221 calculates the distance of AP1 in accordance with "AP0×cos($\theta 0 - \theta 1$)=AP1". Also, the target region determining unit 221 calculates the horizontal component of the depth of the neck (the distance of BP2) on the basis of the angles $\theta 0$, $\theta 2$ and the depth of the neck of the customer 30 (the distance of BP0). Specifically, the target region determining unit 221 calculates the distance of BP2 in accordance with "BP0×cos($\theta 0 + \theta 2$)=BP2".

For example, the correction coefficient for converting the distance of AP0 into the distance of AP1 and the correction coefficient for converting the distance of BP0 into the distance of BP2 may be prepared in advance in the storage device, and the target region determining unit 221 may correct the depths using these correction coefficients. These correction coefficients are common for the head and the neck, and for example may be prepared for each depression angle of the sensor device 100 (the angle $\theta 0$) and for each discrete position of the head or the neck in the vertical direction on the image. Also, the correction coefficients may be prepared for each depression angle of the sensor device 100 (the angle $\theta 0$), and for each coordinate difference value of the head or the neck in the vertical direction on the image.

Because the orientation of the customer is determined based on the depth relationship between the head and the neck, the two depth values may be corrected in such a manner that the ratio between the two depth values becomes equal to the ratio between the horizontal components of the two depths, instead of being corrected to the absolutely accurate value of the horizontal component. In this case, the target region determining unit 221 may correct at least one of the depth of the head and the depth of the neck received from the sensor device 100, using the correction coefficient corresponding to the depression angle of the sensor device 100 (the angle $\theta 0$) and the difference value in the vertical coordinate on the image between the head and the neck, for example.

FIG. 17 is a flowchart illustrating an example of the process to determine the orientation of the customer in the third embodiment. The difference from the second embodiment is that step S124a is added between step S124 and step S126. In FIG. 17, the depression angle of the sensor device 100 is stored in advance by the input operation of the user in the movement determining apparatus 200 in the movement determining system of the third embodiment. In the following, step S124a will be described.

(S124a) As described in FIG. 16, the target region determining unit 221 corrects the depth (the position in the Z-axis direction) of the head of the customer 30 to the horizontal component, on the basis of the position of the head of the customer 30 and the depression angle $\theta 0$. Also, as described in FIG. 16, the target region determining unit 221 corrects the depth (the position in the Z-axis direction) of the neck of the customer 30 to the horizontal component, on the basis of the position of the neck of the customer 30 and the depression angle $\theta 0$. In following step S126, the target region determining unit 221 compares the depth of the head after the correction and the depth of the neck after the correction.

The movement determining system of the third embodiment corrects the depths of the head and the neck to the horizontal components of those depths, on the basis of the depression angle of the sensor device 100 (the angle $\theta 0$) and the position information of the head and the neck of the customer 30. Thereby, the distance to the head of the customer 30 and the distance to the neck of the customer 30 are accurately compared, regardless of the height of the installation location of the sensor device 100, in order to accurately determine the orientation of the customer 30. Accordingly, whether the hand of the customer has entered into the article location region is accurately determined.

As described above, the information processing of the first embodiment is realized by causing the information processing apparatus 2 to execute the program, and the information processings of the second and third embodiments are realized by causing the sensor device 100 and the movement determining apparatus 200 to execute the program. These programs can be recorded in a computer-readable recording medium (for example, the recording medium 23). For example, a magnetic disk, an optical disc, a magneto-optical disk, a semiconductor memory and the like can be used as the recording medium. The magnetic disk includes a FD and a HDD. The optical disc includes a CD, a CD-R(Recordable)/RW(Rewritable), a DVD, and a DVD-R/RW.

When the program is put in the market, the portable recording medium having the program recorded thereon is provided, for example. For example, the computer writes the program recorded in the portable recording medium or received from another computer into the storage device (for example, the HDD 203), and reads the program from the storage device to execute the program. Note that the program may be read from the portable recording medium and directly executed. Also, at least a part of the above information processing may be realized by an electronic circuit such as a DSP (Digital Signal Processing), an ASIC, and a PLD (Programmable Logic Device). In one aspect, the orientation of the person can be determined in various situations.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A movement determining method comprising:
    acquiring, by an information processing apparatus, a first distance between a head of a person and a reference position and a second distance between a neck of the person and the reference position, the person appearing in an image captured by an image capturing device, the first distance being acquired as a value corresponding to a pixel of the image where the head appears, the second distance being acquired as a value corresponding to a pixel of the image where the neck appears, the reference position being a position where the image capturing device is located; and
    determining, by the information processing apparatus, an orientation of the person with respect to the reference position on the basis of a comparison result between the first distance and the second distance.

2. The movement determining method according to claim 1, wherein
    the movement determining method further includes selecting, by the information processing apparatus, one or more set regions on which a predetermined process is to be executed, from a plurality of set regions set on the image, on the basis of the determined orientation of the person.

3. The movement determining method according to claim 2, wherein
    the predetermined process is a process, by the information processing apparatus, to determine whether a hand of the person is included in the selected one or more set regions, on the basis of a coordinate of the hand on the image.

4. The movement determining method according to claim 3, wherein
    at least one of the set regions is set on an object present at a far side of the person in relation to the image capturing device, and
    the selecting includes excluding at least the set region set on the object present at the far side of the person, from the set regions on which the predetermined process is to be executed, when the information processing apparatus determines that the person does not face in an opposite direction to the image capturing device.

5. The movement determining method according to claim 2, wherein
    the determining includes determining the orientation of the person, using a value obtained by correcting at least one of the acquired first distance and the second distance on the basis of an angle between an image capturing direction of the image capturing device and a horizontal plane.

6. The movement determining method according to claim 1, wherein
    the determining includes determining whether the person faces in a direction toward the reference position or in an opposite direction to the reference position, on the basis of the comparison result between the first distance and the second distance.

7. A movement determining apparatus comprising:
    a processor configured to perform a process including:
    acquiring a first distance between a head of a person and a reference position, and a second distance between a neck of the person and the reference position, the person appearing in an image captured by an image capturing device, the first distance being acquired as a value corresponding to a pixel of the image where the head appears, the second distance being acquired as a value corresponding to a pixel of the image where the neck appears, the reference position being a position where the image capturing device is located; and
    determining an orientation of the person with respect to the reference position on the basis of a comparison result between the first distance and the second distance.

8. The movement determining apparatus according to claim 7, wherein
    the process further includes selecting one or more set regions on which a predetermined process is to be executed, from a plurality of set regions set on the image, on the basis of the determined orientation of the person.

9. The movement determining apparatus according to claim 8, wherein
    the predetermined process is a process to determine whether a hand of the person is included in the selected one or more set regions, on the basis of a coordinate of the hand in the image.

10. The movement determining apparatus according to claim 9, wherein
    at least one of the set regions is set on an object present at a far side of the person in relation to the image capturing device, and
    the selecting includes excluding at least the set region set on the object present at the far side of the person, from the set regions on which the predetermined process is to be executed, when the processor determines that the person does not face in an opposite direction to the image capturing device.

11. The movement determining apparatus according to claim 8, wherein
    the determining includes determining the orientation of the person, using a value obtained by correcting at least one of the acquired first distance and the second distance on the basis of an angle between an image capturing direction of the image capturing device and a horizontal plane.

12. The movement determining apparatus according to claim 7, wherein
    the determining includes determining whether the person faces in a direction toward the reference position or in an opposite direction to the reference position, on the basis of the comparison result between the first distance and the second distance.

13. A non-transitory computer-readable storage medium storing a computer program that causes a computer to perform a process comprising:

acquiring a first distance between a head of a person and a reference position, and a second distance between a neck of the person and the reference position, the person appearing in an image captured by an image capturing device, the first distance being acquired as a value corresponding to a pixel of the image where the head appears, the second distance being acquired as a value corresponding to a pixel of the image where the neck appears, the reference position being a position where the image capturing device is located; and determining an orientation of the person with respect to the reference position on the basis of a comparison result between the first distance and the second distance.

14. The movement determining method according to claim 1, wherein the first distance and the second distance are specified on the basis of depth information measured by using a depth sensor.

15. The movement determining method according to claim 1, wherein the determining includes determining whether the person faces in a direction toward the reference position or in an opposite direction to the reference position, on the basis of a determination result of whether the first distance is shorter than the second distance.

\* \* \* \* \*